(12) United States Patent
Matsumori et al.

(10) Patent No.: US 9,868,907 B2
(45) Date of Patent: Jan. 16, 2018

(54) LIQUID CRYSTAL DISPLAY DEVICE AND MANUFACTURING METHOD THEREOF

(71) Applicants: JAPAN DISPLAY INC., Tokyo (JP); Panasonic Liquid Crystal Display Co., Ltd., Hyogo (JP)

(72) Inventors: Masaki Matsumori, Tokai (JP); Yasushi Tomioka, Hitachinaka (JP); Noboru Kunimatsu, Chiba (JP)

(73) Assignees: Japan Display Inc., Tokyo (JP); Panasonic Liquid Crystal Display Co., Ltd., Hyogo (JP)

( * ) Notice: Subject to any disclaimer, the term of this patent is extended or adjusted under 35 U.S.C. 154(b) by 311 days.

(21) Appl. No.: 14/678,381

(22) Filed: Apr. 3, 2015

(65) Prior Publication Data

US 2015/0210923 A1 Jul. 30, 2015

Related U.S. Application Data

(63) Continuation of application No. 14/061,284, filed on Oct. 23, 2013, now Pat. No. 9,028,926, which is a
(Continued)

(30) Foreign Application Priority Data

Aug. 24, 2007 (JP) ................................. 2007-218859

(51) Int. Cl.
*C09K 19/56* (2006.01)
*G02F 1/13* (2006.01)
(Continued)

(52) U.S. Cl.
CPC .............. *C09K 19/56* (2013.01); *C08L 33/24* (2013.01); *C08L 77/06* (2013.01); *G02F 1/137* (2013.01);
(Continued)

(58) Field of Classification Search
CPC ... C09K 19/56; G02F 1/137; G02F 1/133723; G02F 1/133788; C08L 33/24; C08L 77/06; B32B 2457/202
(Continued)

(56) References Cited

U.S. PATENT DOCUMENTS 5,441,845 A 8/1995 Okinoshima et al.
5,637,672 A * 6/1997 Rieger ............... C08G 73/1039
349/123

(Continued)

FOREIGN PATENT DOCUMENTS

JP 07-228777 A 8/1995
JP 07-319162 A 12/1995
(Continued)

OTHER PUBLICATIONS

Gibbons et al., Surface-mediated alignment of nematic liquid crystals with polarized laser light, Letters to Nature, May 2, 1991, vol. 351.

*Primary Examiner* — Michael M Bernshteyn
(74) *Attorney, Agent, or Firm* — Typha IP LLC

(57) ABSTRACT

An IPS type liquid crystal display device superior in mass productivity and improved in image quality with a higher contrast ratio by decreasing the occurrence of defective display due to the disorder of the initial liquid crystal alignment by the liquid orientation control film and realizing stable alignment of liquid crystals comprises: a pair of substrates, at least one which is transparent; a liquid crystal layer disposed between the pair of substrates; a group of electrodes formed on at least one of the pair of substrates to apply an electric field to the liquid crystal layer; plural active elements connected to the group of electrodes; and an orientation control film disposed on at least one of the pair of substrates, wherein said orientation control film is made of a photosensitive polyimide and a polyamide acid ester
(Continued)

and is given orientation control ability by being irradiated with substantially linearly polarized light.

16 Claims, 8 Drawing Sheets

Related U.S. Application Data continuation of application No. 12/192,202, filed on Aug. 15, 2008, now Pat. No. 8,592,009.

(51) Int. Cl.
    *C08L 33/24*     (2006.01)
    *C08L 77/06*     (2006.01)
    *G02F 1/137*     (2006.01)
    *G02F 1/1337*     (2006.01)
    *G02F 1/1343*     (2006.01)

(52) U.S. Cl.
    CPC .. *G02F 1/133723* (2013.01); *G02F 1/133788* (2013.01); *B32B 2457/202* (2013.01); *G02F 1/134363* (2013.01); *G02F 2001/13706* (2013.01); *G02F 2001/133749* (2013.01); *Y10T 428/1005* (2015.01); *Y10T 428/1018* (2015.01); *Y10T 428/1023* (2015.01)

(58) Field of Classification Search
    USPC ........................................................ 428/1.2
    See application file for complete search history.

(56) References Cited

U.S. PATENT DOCUMENTS

| | | | |
|---|---|---|---|
| 6,235,867 | B1 | 5/2001 | Eguchi et al. |
| 8,592,009 | B2 | 11/2013 | Matsumori et al. |
| 2001/0048498 | A1* | 12/2001 | Tomioka ........... G02F 1/133723 349/123 |
| 2005/0271833 | A1* | 12/2005 | Matsumori ....... G02F 1/134363 428/1.25 |

FOREIGN PATENT DOCUMENTS

| | | |
|---|---|---|
| JP | 09-073101 A | 3/1997 |
| JP | 2001-281671 A | 10/2001 |
| JP | 2005-351924 A | 12/2005 |

* cited by examiner

LIQUID CRYSTAL DISPLAY DEVICE AND MANUFACTURING METHOD THEREOF

CROSS-REFERENCE TO RELATED APPLICATION

This application is continuation of U.S. patent application Ser. No. 14/061,284, filed Oct. 23, 2013 (now U.S. Pat. No. 9,028,926), which is a continuation of U.S. patent application Ser. No. 12/192,202 filed on Aug. 15, 2008 (now U.S. Pat. No. 8,592,009), and claims priority from Japanese application No. JP2007-218859 filed on Aug. 24, 2007, the contents of each of which are hereby incorporated by reference into this application.

BACKGROUND OF THE INVENTION

1. Field of the Invention

The present invention relates to a photo-alignment-method-applied liquid crystal display device and its manufacturing method.

2. Description of the Related Art

Commonly, display by a liquid crystal display device is implemented by applying voltage to liquid crystal molecules in a liquid crystal layer sandwiched between a pair of substrates so as to change the orientation of liquid crystal molecules and by utilizing the resultant change in the optical properties of the liquid crystal layer. Liquid crystal display devices provided with a switching device such as a thin film transistor on a pixel-by-pixel basis, which are commonly referred to as active-drive-type liquid crystal display devices, are conventionally represented by the Twisted Nematic (TN) display type. This type has electrodes formed on each of the two substrates forming a pair sandwiching the liquid crystal layer such that voltage is applied to the liquid crystal layer substantially perpendicularly to the boundary faces between the substrates and the liquid crystal layer and implements display by utilizing the optical rotatory effect of liquid crystal molecules constituting the liquid crystal layer. The largest problem with liquid crystal display devices of this TN type is their narrow viewing angles.

Also known is the IPS type which has inter-digital electrodes formed on one of a pair of substrates so that an electric field substantially in parallel with the surfaces of the substrates is generated to implement display by utilizing the birefringence of the liquid crystal layer, that is, by rotating liquid crystal molecules constituting the liquid crystal layer in a plane substantially parallel with the substrates. Due to the in-plane switching of liquid crystal molecules, this IPS type has a wider viewing angle, lower load capacitance and other advantages over the TN type. Considered promising as a new liquid crystal display device which may replace the TN type, the IPS type is recently making rapid progress. Disclosed in Patent JP-A-9-73101 is an IPS type which attained improved transmittance by using a transparent conductive film to form one or both of a pair of electrodes to apply an electric field to the liquid crystal layer.

Due to superior viewing angle characteristics (luminance contrast ratio and tone/color inversion) and bright display, the IPS type liquid crystal display device (hereinafter, denoted as "IPS-TFT-LCD") is a promising technology for monitors and televisions having wider display areas. In the IPS-TFT-LCD, orientation control films given the capability to control the orientation of liquid crystals are formed on the respective interfaces of the liquid crystal layer with the pair of substrates which sandwich the liquid crystal layer. In this connection, however, it is still difficult to practically manufacture 20-inch or larger size IPS-TFT-LCDs (large panels) unless a new structure or process is developed.

In the case of the IPS-TFT-LCD, it is especially difficult to impart uniform alignment treatment to the whole area of the large orientation control films because of many steps in contact with the liquid crystal layer. As compared with the conventional TN type and in particular with the currently-popular normally-open TN type (bright with low voltage and dark with high voltage), the margin allowed for the alignment treatment of the orientation control films is remarkably narrow. This narrow margin is attributable to the following three points (1) to (3).

(1) Stepped Structure

Due to the principle, the IPS-TFT-LCD is required to have a number of about-several-μm-wide, long, thin electrodes (sometimes referred to as inter digital electrodes) disposed therein. Therefore, fine step structures are formed. Although dependent on the thicknesses of the electrodes and the geometries of various films formed thereon, their heights usually exceed 10 nm. In a high-transmissivity pixel structure, a thick inorganic insulating film is formed, and its surface has a certain level of planarity regardless of the surface irregularities of the layers below it. Thus, in the high-transmissivity pixel structure, the steps (surface irregularities) of the orientation control film are mainly attributable to the top electrode layer. Over these steps, an orientation control film (also referred to as an alignment film) made of polyimide or other polymer is formed.

In the conventional mass-production technology, a rubbing process is performed on this orientation control film in order to impart a liquid crystal alignment (initial alignment) ability to the film. The rubbing cloth comprises 10-to-30-μm diameter, thin fibers bound together. Substantially, the liquid crystal alignment ability is imparted to the alignment film as a result of each fine fiber giving a certain directional shearing force locally to the film. Although very thin fibers in the order of several microns are available, such very thin fibers are not practically used for the rubbing alignment since rigidity is needed to give a certain level of frictional force. In the IPS scheme, since the inter-electrode space ranges approximately from 4 to 30 μm and therefore is substantially the same as or smaller than the fiber diameter, poor alignment is likely to occur around the steps due to insufficient rubbing. This poor alignment results in lower image quality since it lowers the black level (blackness) and consequently lowers the contrast ratio and lowers the luminance uniformity.

(2) Alignment Angle

Due to the principle, the IPS-TFT-LCD is required to set the initial alignment direction deviated from the longitudinal direction of electrodes or from the direction perpendicular to that longitudinal direction by a certain angle. Here, the electrodes refer to signal line electrodes, common electrodes within pixels, and pixel electrodes. To define the initial alignment direction by rubbing, it is necessary to rub the alignment film with 10-to-30-μm fibers in a direction inclined at a predetermined angle as described above. However, fibers tend to be dragged along the edges of steps formed due to wiring lines extending in a particular direction, such as signal line electrodes, common electrodes within pixels, and pixel electrodes. This disturbs the alignment, resulting in a shallower black level and other disadvantages in image quality.

(3) Deepening of Black Level

One of the characteristics of the IPS-TFT-LCD is its superior in deepening the dark level (black display). Accordingly, disorder in the alignment is likely to be visually noticeable as compared with other types. In the conventional normally-open TN type, a dark level is attained when high voltage is applied. In this case of the high voltage, almost all liquid crystal molecules are oriented in the direction of the electric field perpendicular to the substrates. The dark level is obtained by the relationship between the alignment of the liquid crystal molecules at high voltage and the arrangement of polarizers. Thus, theoretically, the dark level uniformity is not much subject to the initial state of orientation at low voltage. Further, human eye are sensitive to changes of the black level since they perceive luminance unevenness as a relative ratio of luminance and its perception reacts substantially on a logarithmic scale. In this respect, the conventional normally-open TN type has an advantage since liquid crystal molecules are forcibly oriented to one direction with high voltage irrespective of the initial state of orientation.

In the case of the IPS type, since the dark level display is produced at low or zero voltage, the IPS type is sensitive to the disorder of the initial orientation. In particular, if liquid crystal molecules are homogeneously oriented such that they are parallel to the upper and lower substrates and if polarizers are arranged such that the optical transmission axis of one polarizer is parallel to the orientation direction of the liquid crystal molecules and that of the other polarizer is orthogonal to that orientation direction of the liquid crystal molecules (called birefringence mode), polarized light incident on the liquid crystal layer travels without being linearly disturbed almost at all. This is effective in deepening the dark level.

In the birefringence mode, transmittance T is commonly given by the following equation.

$$T = T_0 \cdot \sin^2\{2\theta(E)\} \cdot \sin^2\{(\pi \cdot \text{deff} \cdot \Delta n)/\lambda\}$$

In the equation, $T_0$ is a coefficient determined mainly by the transmittances of the polarizers used in the liquid crystal panel; $\theta(E)$ is the angle between the orientation direction of liquid crystals (effective optical axis of the liquid crystal layer) and the transmission axis of polarized light; E is the intensity of an applied electric field; deff is the effective thickness of the liquid crystal layer; $\Delta n$ is the anisotropic refractive index of the liquid crystals; and $\lambda$ is the wavelength of the light. The product of the effective thickness of the liquid crystal layer, deff, and the liquid-crystal anisotropic refractive index $\Delta n$, i.e., deff·$\Delta n$, is called retardation. Note that the liquid crystal layer's effective thickness deff is not the whole thickness of the liquid crystal layer but the partial thickness of the liquid crystal layer where the orientation directions of the liquid crystal molecules actually change when voltage is applied. This is because liquid crystal molecules near the boundary faces of the liquid crystal layer do not change their orientation direction due to anchoring effects near the boundary faces even when voltage is applied. Thus, the whole thickness dLC of the liquid crystal layer sandwiched by the substrates is always lager than deff, i.e., deff<dLC. This difference can be roughly estimated to be from 20 nm to 40 nm although dependent on what substances respectively constitute the liquid crystal layer and the alignment films in contact with the liquid crystal layer.

As is obvious from the above equation, only the term $\sin^2\{2\theta(E)\}$ of the equation is dependent on the electric field intensity. The luminance can be adjusted by changing the angle $\theta$ according to the electric field intensity E. Operation of the normally-closed type is sensitive to the disorder of the initial alignment since the polarizers are arranged such that $\theta$ is 0 degrees when voltage is not applied.

Thus, uniform alignment is very important for the IPS type. Accordingly, problems of the conventional rubbing method have come to the fore. Generally, the rubbing alignment has many problems with its rubbing process, including not only damage to TFTs by frictionally charged electricity and defective display due to poor alignment attributable to the disordered fiber ends of the rubbing cloth and dust but also the necessity to frequently replace the rubbing cloth. In order to solve these problems of the rubbing alignment process, various methods capable of imparting the liquid crystal aligning properties without rubbing, which are commonly referred to as "rubbing-less" alignment methods, have been studied and proposed. Among them is the photo-alignment technique which irradiates a polymer film with polarized ultraviolet light or the like to give the film the ability to align liquid crystal molecules without conducting the rubbing process.

An example of this technique is disclosed in Gibbons et al., "Nature," Vol. 351, p. 49 (1991). Not needing the conventional rubbing process, this technique can impart the liquid crystal aligning ability to a film by irradiating it with polarized light. Unlike the rubbing method, this photo-alignment method is free from film surface damage, static electricity and other problems. In addition, its simplicity as a manufacturing process is advantageous in terms of industrial manufacturing. Accordingly, this method is gathering attraction as a new method for giving the liquid crystal aligning ability without performing the rubbing process.

As the material for the liquid crystal alignment film, it is proposed to use a polymer compound having a photoreactive group introduced to side chains thereof since the material must be photochemically sensitive to polarized light. Polyvinyl cinnamate may be cited as a major example. In this case, dimerization at the side chains caused by irradiation is thought to produce anisotropy in the polymer film, thereby aligning liquid crystals. It is also proposed to distribute a low-molecular-weight dichroic azo dye in the polymer material and irradiate the film surface with polarized light to create the liquid crystal aligning ability in the film. Further, it is reported that a specific polyimide, if irradiated with polarized ultraviolet light or the like, aligns liquid crystal molecules. The liquid crystal aligning ability in this case is considered attributable to depolymerization of polyimide main chains in a fixed direction by irradiated light.

SUMMARY OF THE INVENTION

As above, the optical-irradiation photo alignment is proposed and discussed as a rubbingless alignment method to solve the problems of the rubbing alignment method. To put this method to practical use, however, the following problems have yet to be solved. In the case of polyvinyl cinnamate and other polymer materials which have photosensitive groups introduced to side chains thereof, reliability is not enough for practical use since the thermal stability of alignment is not satisfactory. Structurally, it is thought that the liquid crystal aligning ability is created locally at the polymer side chains in this case. This may be not preferable in aligning liquid crystals more uniformly and strongly. Distribution of a low-molecular-weight dichroic dye among polymer molecules is also not satisfactory in thermal and optical reliability in view of practical application since the liquid crystal alignment dye itself is low in molecular weight.

Further, the method of irradiating a specific polyimide with polarized ultraviolet light cannot easily secure sufficient reliability in practical application since the alignment mechanism is considered to be attributable to photo-induced depolymerization although the polyimide itself is highly reliable in thermal stability. That is, unless the liquid crystal alignment ability attained by irradiating with polarized light is improved in stability or durability, these photo-alignment methods cannot be used practically. Temporal liquid crystal alignment ability is not satisfactory. In view of practical industrial application, it is also desirable to select a thermally stable polymer structure. In these respects, the polymer materials proposed so far for optical-irradiation alignment are not necessarily sufficient to attain strong and stable orientation control of liquid crystals, posing the largest problem in the way of realizing the optical-irradiation rubbingless alignment.

Recently, demand for more stable alignment is further intensifying. Polyimide photo-alignment films, made from thermally treated polyamide acids, are becoming incapable of meeting the required level. Extensive studies by the present inventors have revealed that polyimide photo-alignment films attained by thermally imidating polyamide acids are low in molecular weight since drastic thermal depolymerization occurs during the thermal process. This reduction in molecular weight due to the thermal treatment lowers the stability of liquid crystal orientation, causing image persistence (image burn-in) in a liquid crystal display device.

The IPS-TFT-LCD has an inherent problem that the manufacturing margin allowed for the alignment process is narrower as mentioned earlier. It is thus an object of the present invention to provide a liquid crystal display device, in particular, a large scale one, capable of displaying higher-contrast-ratio and higher-definition images, by solving the above problem and consequently reducing defective display due to the variation of the initial orientation direction and realizing stable liquid crystal orientation. It is another object of the present invention to provide a manufacturing method superior in mass productivity for high-image-quality and high-definition liquid crystal display devices.

The present invention provides a liquid crystal display device comprising: a pair of substrates, at least one of which is transparent; a liquid crystal layer disposed between the pair of substrates; a group of electrodes formed on at least one of the pair of substrates to apply an electric field to the liquid crystal layer; plural active elements connected to the group of electrodes; and an orientation control film disposed on at least one of the pair of substrates, wherein at least one of the orientation control film is made of photosensitive polyimide and polyamide acid ester and is given orientation control ability by being irradiated with almost linearly polarized light.

Use of the polyamide acid ester material according to the present invention can reduce thermal depolymerization during thermal treatment. It is therefore possible to improve the stability of liquid crystal orientation in a liquid crystal display device where photo-alignment is applied.

DESCRIPTION OF THE PREFERRED EMBODIMENTS

Figure 1:
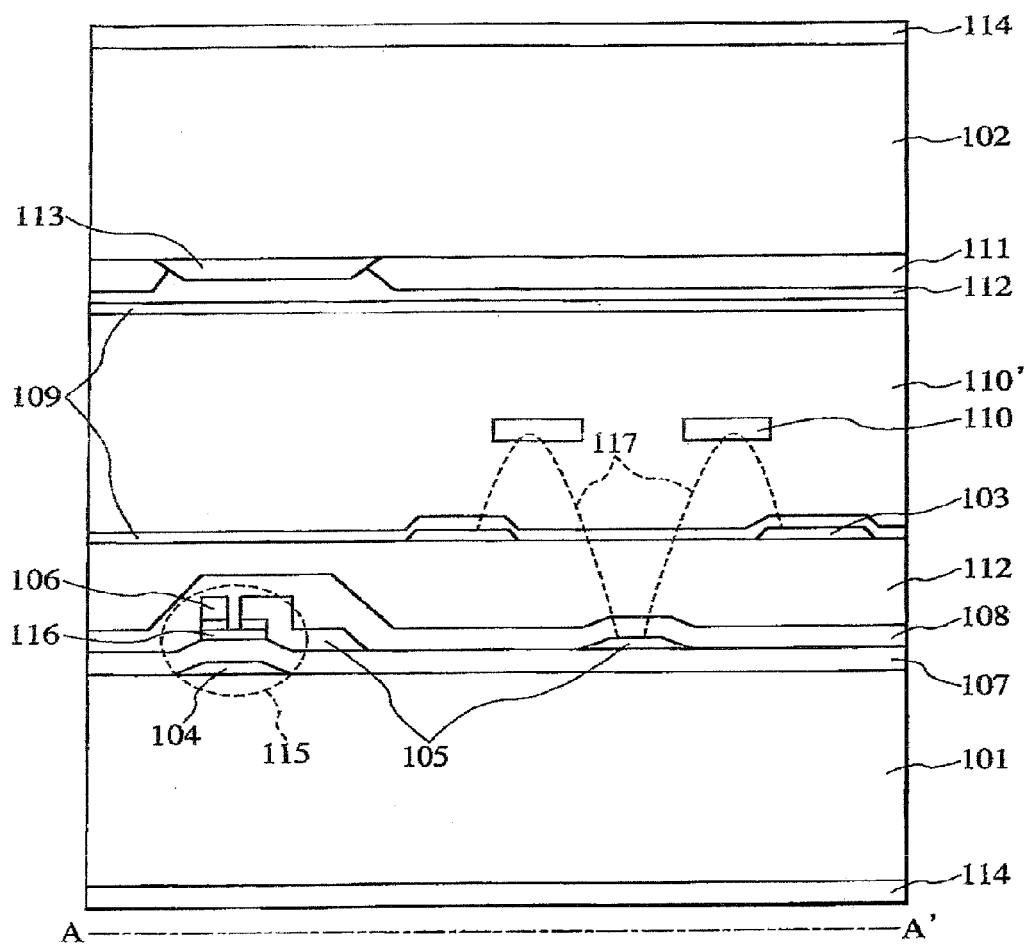
FIG. 1 depicts a cross-section of a pixel in Embodiment 1 for explaining how one pixel is constructed.

An orientation control film according to the present invention contains polymer units of a polyamide acid amide represented by the following general formula (102) or (103), a polyamide acid alkyl silyl ester represented by the following general formula (113) or (114), and/or a polyamide acid ester represented by the following general formula (116) or (117). In the formulae, each $R_1$ is individually hydrogen or an alkyl group containing 1 to 8 carbon atoms, each $R_2$ is individually a hydrogen atom, fluorine atom, chlorine atom, bromine atom, phenyl group, alkyl group containing 1 to 6 carbon atoms, alkoxy group containing 1 to 6 carbon atoms, vinyl group ($-(CH_2)m-CH=CH_2$, m=0, 1, 2) or alkynyl group ($-(CH_2)m-C\equiv CH$, m=0, 1, 2), and Ar is an aromatic compound.

[Formula 102]

[Formula 103]

[Formula 113]

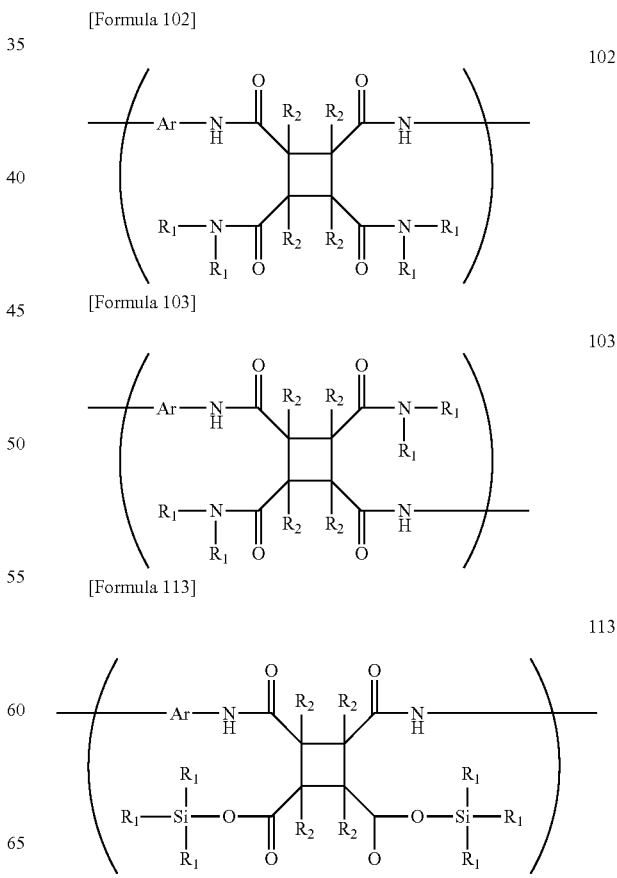

[Formula 114]

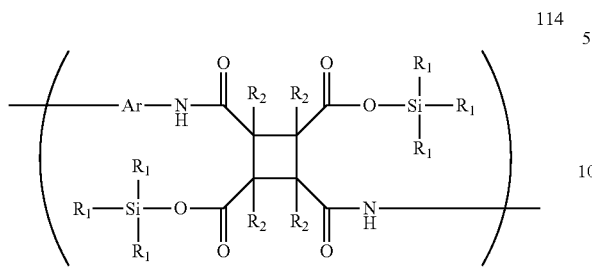
(114)

[Formula 116]

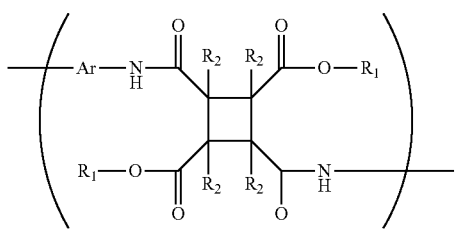
(116)

[Formula 117]

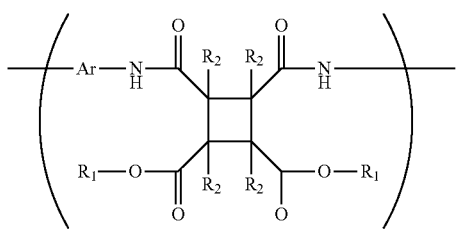
(117)

The above-mentioned structure enables reduction of thermal depolymerization during thermal treatment. This structure improves the stability of liquid crystal orientation and can very effectively suppress image persistence (burn-in) in liquid crystal display devices.

The above-mentioned orientation control film according to the present invention may contain a polyamide acid represented by the following general formula (121) or (122). In the formulae, each R2 is individually a hydrogen atom, fluorine atom, chlorine atom, bromine atom, phenyl group, alkyl group containing 1 to 6 carbon atoms, alkoxy group containing 1 to 6 carbon atoms, vinyl group (—$(CH_2)_m$-CH=$CH_2$, m=0, 1, 2) or alkynyl group (—$(CH_2)_m$-C≡CH, m=0, 1, 2), and Ar is an aromatic compound.

[Formula 121]

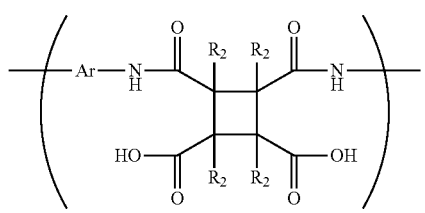
(121)

[Formula 122]

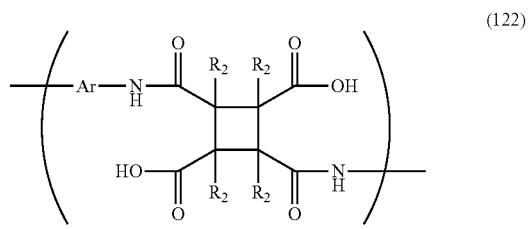
(122)

Since the above-mentioned polyamide acid is contained, it is possible to reduce the resistivity of the alignment film and therefore very effectively suppress image persistence (burn-in) in liquid crystal display devices.

According to the present invention, the above-mentioned aromatic compound Ar contains at least one of those represented by the following general formulae (1) through (11).

[Formula 1]

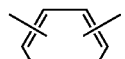
(1)

[Formula 2]

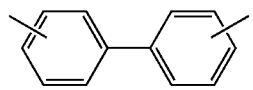
(2)

[Formula 3]

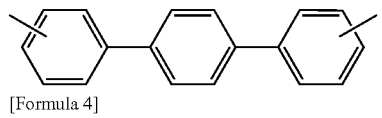
(3)

[Formula 4]

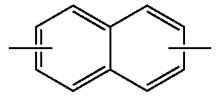
(4)

[Formula 5]

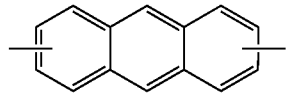
(5)

[Formula 6]

(6)

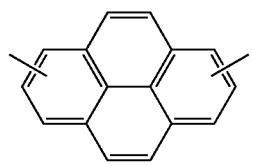

[Formula 7]

—Y—X—
(7)

[Formula 8]

—Y—X—Y—
(8)

[Formula 9]

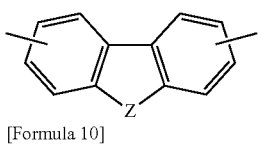
(9)

[Formula 10]

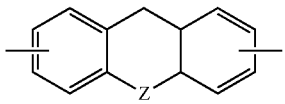
(10)

[Formula 11]

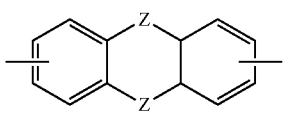
(11)

Individually, each hydrogen molecule of the aromatic rings may instead be a fluorine atom, chlorine atom, bromine atom, phenyl group, alkyl group containing 1 to 8 carbon atoms, alkoxy group, vinyl group or alkynyl group. X is any of an alkyl group containing 1 to 8 carbon atoms, alkoxy group, vinyl group or alkynyl group or an alkyl group containing 0 to 8 carbon atoms and the following functional group, (—O—, —CO—, —COO—, —S—, —SO—, —SO$_2$—, —NH—, —N=N—, phenyl group). Y is an aromatic ring such as a phenyl group, naphthyl group, anthracene group, or pyrene group wherein each hydrogen atom of the aromatic rings individually may instead be a fluorine atom, chlorine atom, bromine atom, phenyl group, alkyl group containing 1 to 8 carbon atoms, alkoxy group, vinyl group, or alkynyl group. Z is any of the following functional groups, (—CH$_2$—, —CO$_2$—, —NH—, —O—, —S—, —SO—, —SO$_2$—) wherein each hydrogen atom may instead be a fluorine atom, chlorine atom, bromine atom, phenyl group, alkyl group containing 1 to 8 carbon atoms, alkoxy group, vinyl group or alkynyl group.

Specifically, the compounds represented by general formulae (7) through (11) have such structures as those of Compound Group A shown below.

[Compound Group A]

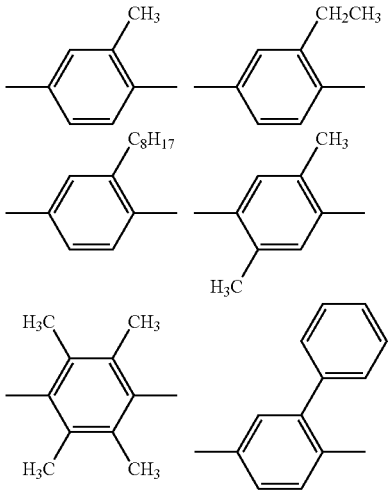

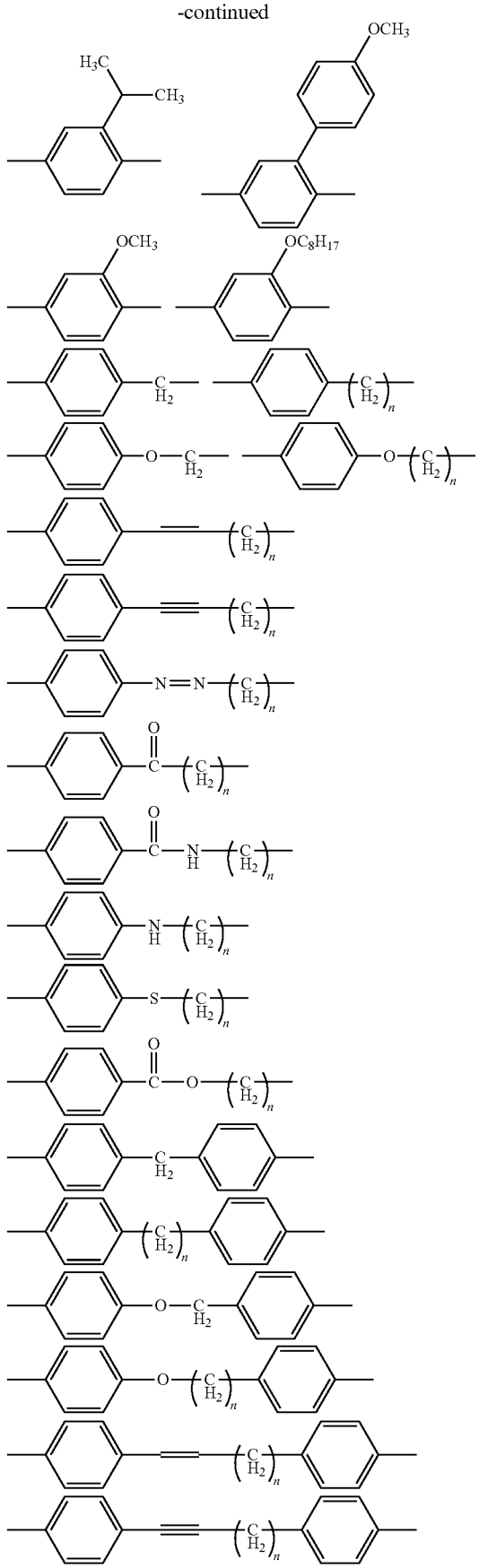

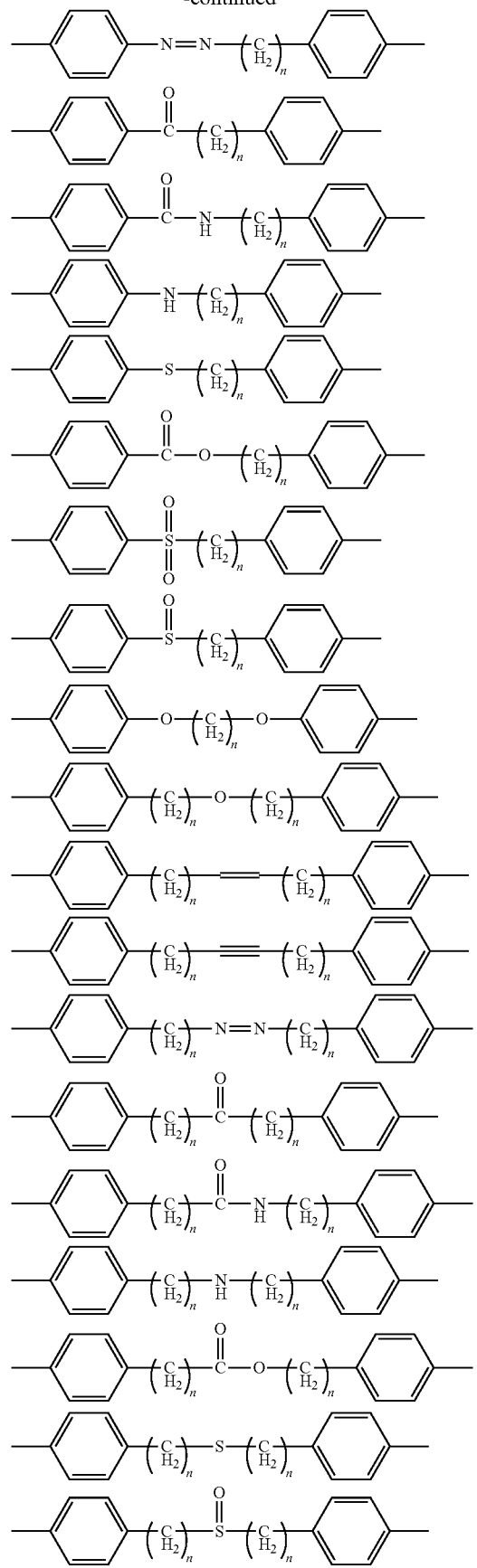
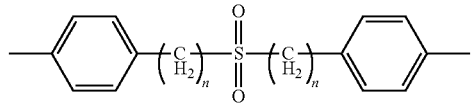
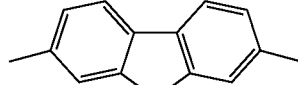
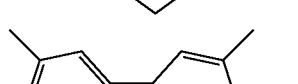
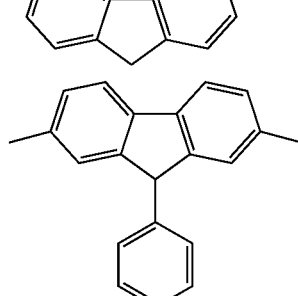
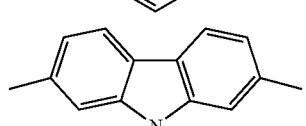
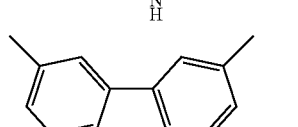
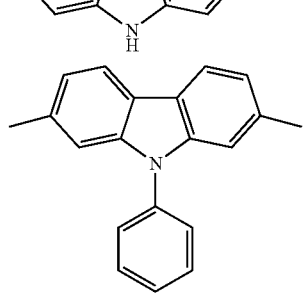
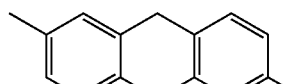
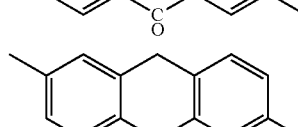
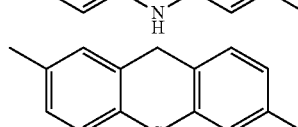
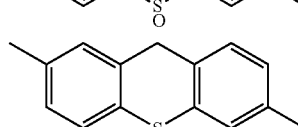
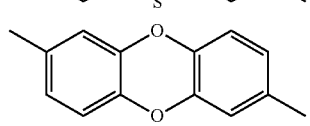

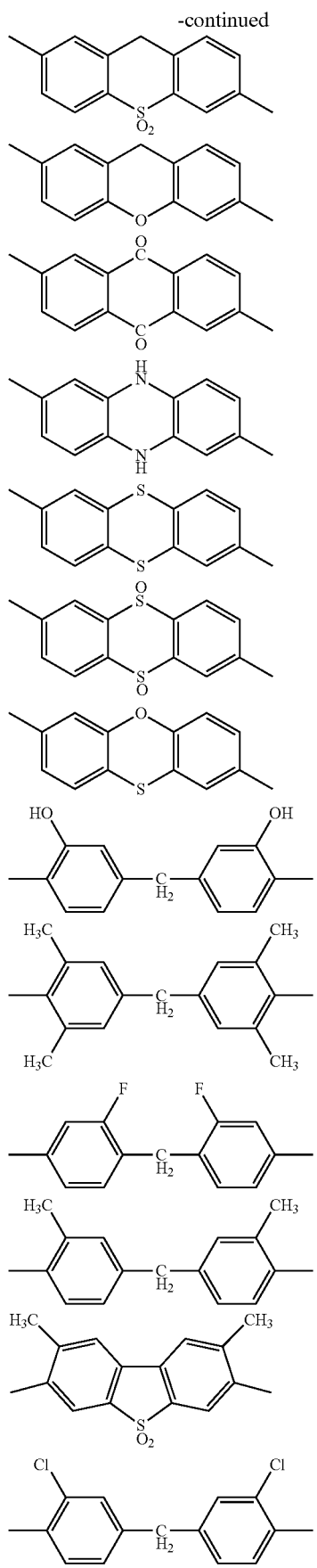
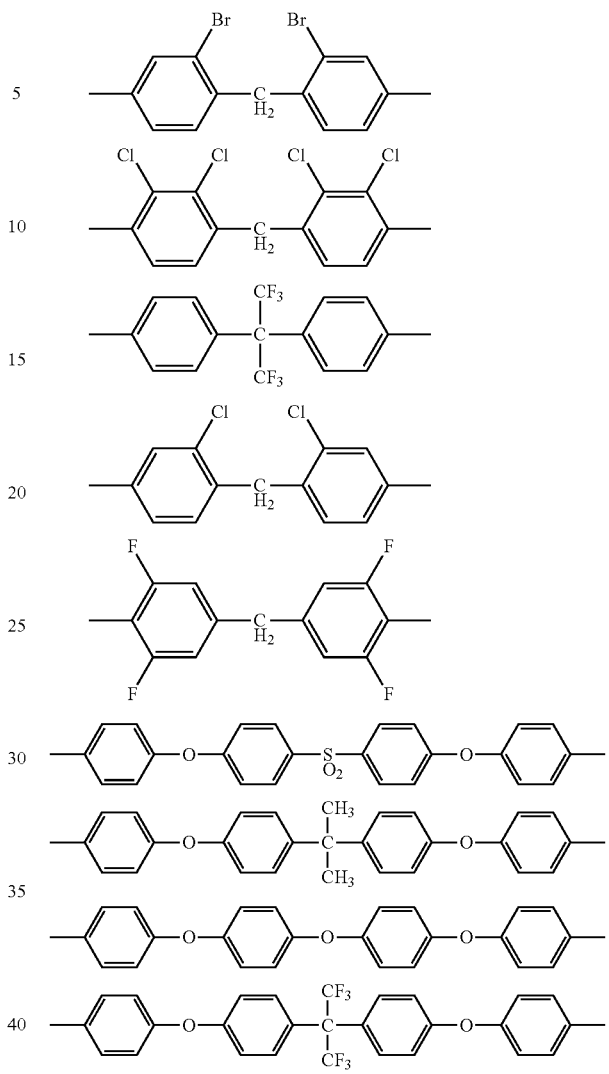
n in Compound Group A is an arbitrary integer from 0 to 8.
According to the present invention, the orientation control film represented by any of the general formulae (102), (103), (113), (114), (116), (117), (121) and (122) is a copolymer or mixture where the cyclobutane section contains at least one of those represented by the following general formulae (51) through (55).
[Formula 51]
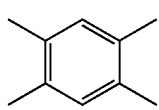
(51)
[Formula 52]
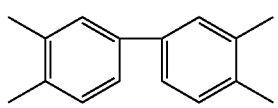
(52)

-continued

[Formula 53]

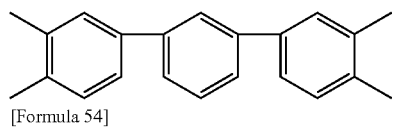
(53)

[Formula 54]

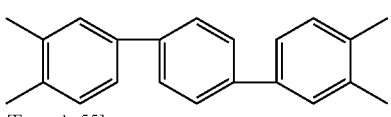
(54)

[Formula 55]

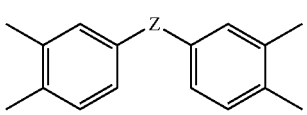
(55)

In the above formulae, each hydrogen molecule of the aromatic rings independently may instead be a fluorine atom, chlorine atom, bromine atom, phenyl group, alkyl group containing 1 to 8 carbon atoms, alkoxy group, vinyl group or alkynyl group. Z is any of the following functional groups, (—CH$_2$—, —CO$_2$—, —NH—, —O—, —S—, —SO—, —SO$_2$—) wherein each hydrogen atom may instead be a fluorine atom, chlorine atom, bromine atom, phenyl group, alkyl group containing 1 to 8 carbon atoms, alkoxy group, vinyl group or alkynyl group.

Since the structure contains the above-mentioned aromatic ring, it is possible to reduce the resistivity of the alignment film and therefore very effectively suppress image persistence (burn-in) in liquid crystal display devices.

Note that of the above-mentioned chemical structures, representative ones were employed in orientation control films in the embodiments described below; however, similar effects are also verified with the other chemical structures.

Embodiments of the present invention will be described below in detail with reference to the drawings. Hereinafter, a substrate having active elements such as thin film transistors formed thereon is referred to as an active matrix substrate. Also, the opposite substrate is referred to as a color filter substrate if the substrate is provided with a color filter. The present invention is desirably targeted at a contrast ratio of 500:1 or higher. The targeted time within which an image sticking fades away is desirably within 5 minutes. The image sticking fading time is determined by a method defined in the following embodiments.

Embodiment 1

Figure 2A:
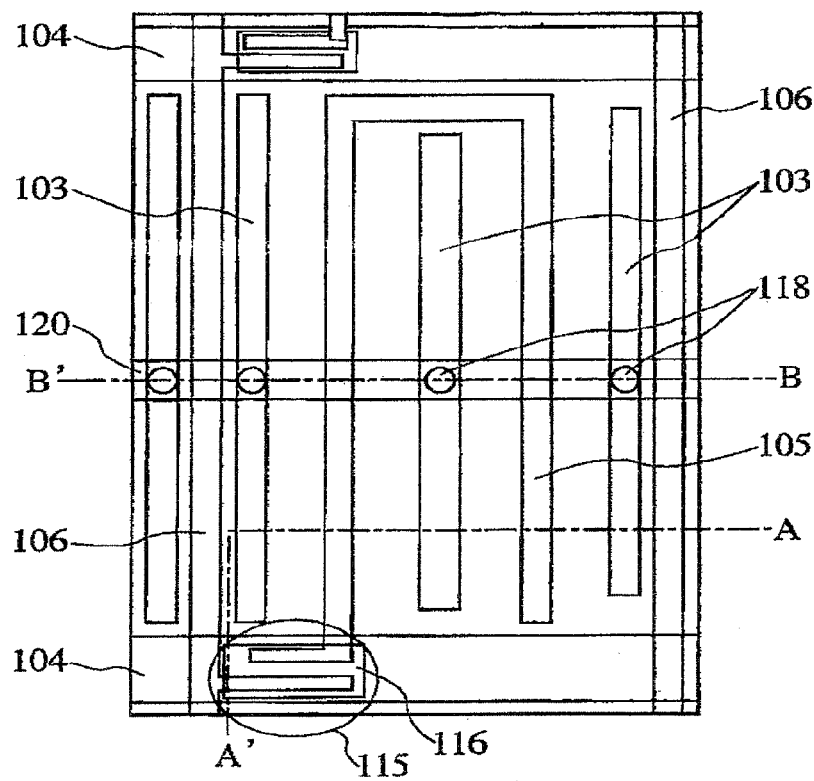
FIGS. 2A, 2B, and 2C depict a top view and cross-sections of the pixel for explaining how one pixel is constructed in Embodiment 1.
Figure 2B:
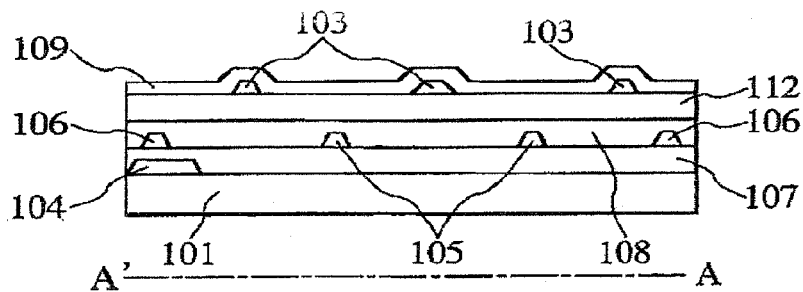
Figure 2C:
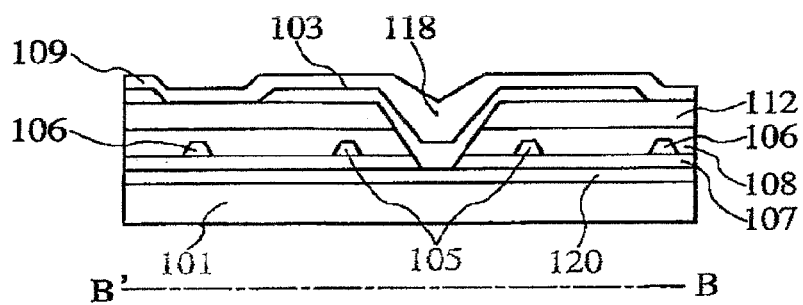

FIG. 1 schematically depicts a cross-section of one pixel and its vicinity in the liquid crystal display device of a first embodiment. FIG. 2 schematically depicts the active matrix substrate for explaining how one pixel is constructed in the liquid crystal display device of the present embodiment. FIG. 2A is its top view, FIG. 2B is a cross-section along line A-A' shown in FIG. 2A, and FIG. 2C is a cross-section along line B-B' shown in FIG. 2A. The cross-section shown in FIG. 1 corresponds to a part of the cross-section along line A-A' shown in FIG. 2A.

Note that since FIG. 2B and FIG. 2C are depicted schematically with emphasis on the structure of the relevant part, they do not completely agree with the actual cross-sections along lines A-A' and B-B' of FIG. 2A. For example, a semiconductor film 116 is not shown in FIG. 2B and, of through holes 118 for connecting common electrodes 103 to a common line 120, only one is representatively shown in FIG. 2C.

In the present embodiment, a scan line (gate electrode) 104 and the common electrode line (common line) 120, which are made of Cr (chromium), are disposed on a glass substrate 101 as the active matrix substrate. A gate insulating film 107 of silicon nitride is formed so as to cover the gate electrode 104 and common line 120. On the gate electrode 104, the semiconductor film 116 of amorphous silicon or polysilicon is disposed via the gate insulating film 107. This semiconductor film 116 serves as the active layer of a thin film transistor (TFT) 115 as an active element. In addition, a signal line (drain electrode) 106 and pixel electrode (source electrode) 105, which are made of Cr.Mo (chromium.molybdenum), are disposed so as to partly overlap with the semiconductor film 116 pattern. A protect layer 108 of silicon nitride is formed so as to cover all of them.

In FIG. 2C, the common electrode 103 connected to the common line 120 is disposed on an overcoat layer (organic protect film) 112 via a through hole 118 formed through the gate insulating film 107 and the protective insulating film 108. In FIG. 2A, a plurality of the common electrodes 103 extending from the common line 120 via a plurality of the through holes 118 are disposed two-dimensionally in the one-pixel region so as to face the pixel electrode 105 of the pixel.

In the present embodiment, pixel electrodes 105 are disposed below the protective insulating film 108 below the organic protection film 112, and common electrodes 103 are disposed on the organic protection film 112. The area sandwiched by these plural pixel electrodes 105 and common electrodes 103 constitutes one pixel. In addition, an orientation control film 109 is formed on the top surface of the active matrix substrate having a matrix of thus-constructed unit pixels disposed thereon, that is, the orientation control film 109 is formed on the organic protection film 112 on which the common electrodes 103 are formed.

On the opposite glass substrate 102, a color filter layer 111 is disposed, as shown in FIG. 1. The color filter 111 is separated for each pixel by a light blocking film (black matrix) 113. In addition, the color filter layer 111 and the light blocking film 113 are covered with an organic protection film 112 of transparent insulating material. Further, an orientation control film 109 is formed on the organic protection film 112 to constitute the color filter substrate.

To these orientation control films 109, liquid crystal alignment ability is given by irradiating them with linearly polarized ultraviolet light obtained from a high-pressure mercury lamp via a pile polarizer comprising a stack of quartz sheets.

The glass substrate 101 constituting the active matrix substrate and the glass substrate 102 constituting the color filter substrate are disposed so as to face each other via the orientation control films 109. Between them, a liquid crystal layer (liquid crystal composition layer) 110' composed of liquid crystals 110 is disposed. In addition, the glass substrate 101 constituting the active matrix substrate and the glass substrate 102 constituting the color filter substrate have polarizers 114 formed respectively on their outer surfaces.

A thin-film-transistor (TFT)-used active matrix liquid crystal display device (TFT liquid crystal display device) is thus constructed. In this TFT liquid crystal display device, when no electric field is applied, the liquid crystal molecules 110 constituting the liquid crystal composition layer 110' are oriented substantially parallel to the mutually facing substrates 101 and 102 and oriented homogeneously in the direction defined initially by a photo-alignment process.

If the TFT 115 is turned on by applying voltage to the gate electrode 104, an electric field 117 is applied to liquid crystal composition layer 110' due to the potential difference between the pixel electrode 105 and the common electrodes 103. Accordingly, the orientation of the liquid crystals 110 constituting the liquid crystal composition layer 110' is changed toward the direction of the electric field due to the interaction between their dielectric anisotropy and the electric field. Utilizing the refractive anisotropy of the liquid crystal layer 110' and the polarizers 114 at this time enables changing the transmittance of the liquid crystal display device in implementing display.

The organic protection films 112 may be made of acrylic resin superior in insulation and transparency or thermosetting resin such as epoxy-acrylic resin and polyimide resin. The organic protection films 112 may also be made of photo-setting transparent resin or inorganic material such as polysiloxane resin. Further, the organic protection films 112 may be designed to serve as the orientation control films, too.

According to the present embodiment as described so far, it is possible to give uniform liquid crystal orientation control ability to the orientation control films 109 over the whole display area without causing local disorder of alignment near the electrodes by using the non-contact photo-alignment technique instead of a buff-used direct rubbing alignment technique.

Generally, different from the vertical electric field scheme as represented by the conventional TN type, the principle of the IPS type requires no tilt of the liquid crystal molecules with respect to the boundary faces between the substrates and the liquid crystal layer. As known, the smaller the tilt angles of the liquid crystal molecules with respect to the boundary faces are, the better the viewing angle characteristics are. It is therefore preferable and effective if the tilt angles of the liquid crystal molecules are controlled to a small angle, specifically down to below 1 degree by the orientation control film since the thus-formed liquid crystal display device can remarkably suppress the color and luminance changes depending on viewing angles.

The following describes how to fabricate the liquid crystal orientation control film of the liquid crystal display device of the present embodiment by using the rubbingless alignment technique. In the present embodiment, fabrication of the orientation control film goes through a process flow comprising the following steps (1) through (4).

(1) Applying/forming an orientation control film (coating the whole display area with a uniform film)

(2) Imidating the orientation control film by baking (removing the varnish solvent and promoting the polyimidation for higher thermostability)

(3) Giving liquid crystal alignment ability by irradiating the film with polarized light (giving uniform alignment ability to the whole display area)

(4) Promoting/stabilizing the alignment ability (by heating, infrared irradiation, far-infrared irradiation, electron irradiation, radioactive irradiation)

The above-mentioned four-step process to fabricate the orientation control film may not be sequentially in the order from (1) to (4). Further effect is expectable in such cases as (a) and (b) below.

(a) Step (4) is temporally overlapped with step (3). Since this accelerates the creation of the liquid crystal alignment ability and induces cross-linking reactions and the like, it is possible to more effectively complete the orientation control film.

(b) Step (4) (heating, infrared irradiation, far-infrared irradiation or the like) is temporally overlapped with steps (2) and (3). Since step (4) also serves to promote the imidation of Step (2), it is possible to more quickly complete the orientation control film.

The following provides a detailed description of how the liquid crystal display device of the present embodiment is manufactured. As the glass substrate 101 constituting the active matrix substrate and as the glass substrate 102 constituting the color filter substrate, surface-polished 0.7-mm-thick glass substrates are used. The thin film transistor on the glass 101 is constructed from a pixel electrode (source electrode) 105, signal line (drain electrode) 106, scan line (gate electrode) 104 and amorphous silicon 116.

The scan lines 104, common electrode lines 120, signal lines 106 and pixel electrodes 105 were all formed by patterning a chromium film. The space between the pixel electrode 105 and the common electrode 103 was designed to be 7 μm. Although the common electrodes 103 and pixel electrodes 105 used a chromium film due to its low resistivity and easy patterning, it is also possible to use an ITO film in order to form transparent electrodes and consequently attain higher luminance performance.

The gate insulating film 107 and the protective insulating film 108 are made of silicon nitride and are both 0.3 μm in thickness. After an acrylic resin was applied onto the protective insulating film 108, baking was done at 220 degrees C. for 1 hour, resulting in the transparent and insulative organic film 112 formed.

Then, a through hole 118 was formed by photolithography and etching. As shown in FIG. 2C, the through hole 118 was formed down to the common electrode line 120. Also, the common electrode 103 connected to the common electrode line 120 was formed by patterning.

By the above steps, an active matrix substrate provided thereon with 1024×3 (for R, G and B sub-pixels) signal lines 106 and 768 scan lines 104 to drive 1024×3×768 pixels was obtained. As shown in FIG. 2A, a pixel electrode 105 is disposed among three common electrodes 103 within each unit pixel (one pixel).

In the present embodiment, the orientation control films 109 were formed from a polyamide acid amide represented by the following general formula (101). The prepared varnish is such that its resin content is 5% by weight, DMAc content is 60% by weight, γ-butyrolactone content was is 20% by weight, and butylcellosolve content is 15% by weight. After the varnish was applied to the active matrix substrate by printing, thermal imidation was performed. Consequently, the varnish was imidated by about 80%, resulting in an about 70-nm-thick fine orientation control film 109 made of polyimide and polyamide acid amide.

[Formula 101]

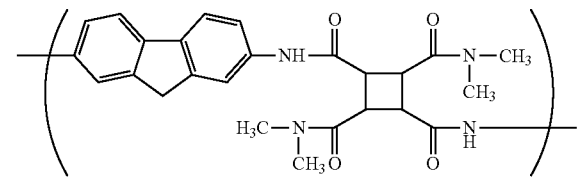

(101)

Likewise, polyamide acid amide varnish was placed by printing on the surface of the other glass substrate 102 having an ITO film formed thereon, and the varnish was imidated by about 80%, resulting in an about 70-nm-thick fine orientation control film 109 made of polyimide and polyamide acid amide. Each orientation control film 109 was irradiated with polarized UV (ultraviolet) light in order to give the liquid crystal alignment ability to its surface. As the light source, a high-pressure mercury lamp was used. UV light in the rage of 240 nm to 380 nm was extracted via an interference filter and linearly polarized at a polarization ratio of about 10:1 through a pile polarizer comprising a stack of quartz sheets. Irradiation energy was given at a rate of about 5 J/cm$^2$. Consequently, it was found that liquid crystal molecules on the surface of the orientation control film were oriented perpendicular to the polarization direction of the radiated polarized UV light.

Then, these two glass substrates 101 and 102 were arranged such that their respective orientation control films 109 given the liquid crystal alignment ability faced each other via scattered spacers of globular polymer beads. By coating their peripheral sections with a sealing agent, they were assembled into a liquid crystal display panel (hereinafter, denoted also as "cell") of the liquid crystal display device. The liquid crystal alignment directions of the two glass substrates are substantially in parallel to each other. Into this cell evacuated, a nematic liquid crystal composition A was injected. Its dielectric anisotropy $\Delta\epsilon$ is positive, or 10.2 (1 kHz, 20 degrees C.); anisotropic refractive index $\Delta n$ is 00.75 (wavelength 590 nm, 20 degrees C.); torsional elastic constant K2 is 7.0 pN; and nematic-to-isotropic phase transition temperature T (N−1) is about 76 degrees C. After that, the cell was sealed with UV-curable resin. The liquid crystal layer's thickness (gap) in the manufactured liquid crystal panel is 4.2 μm.

This liquid display panel has a retardation ($\Delta N \cdot d$) of about 0.31 μm. Preferably, $\Delta N \cdot d$ is in the range of 0.2 μm to 0.5 μm. $\Delta N \cdot d$ beyond this range causes problems such as colored white display. Measuring the pretilt angles of the liquid crystals by a crystal rotation method using another homogeneously-aligned liquid crystal display panel which was constructed by using substantially the same orientation control film and liquid crystal composition as those used for the above panel revealed that they were about 0.2 degree. Then, the liquid crystal panel was sandwiched by two polarizers 114 so that the optical transmission axis of one polarizer is substantially parallel to the liquid crystal alignment direction while that of the other is perpendicular to the liquid crystal alignment direction. Then, the liquid crystal display panel is connected with the drive circuit, backlight and the like to construct a modular active matrix liquid crystal display device. The present embodiment adopted the normally closed switching mechanism in which the liquid crystal display device produces dark display at low voltage and bright display at high voltage.

Then, the display quality of the liquid crystal display device of the present embodiment was evaluated. Its high image quality was verified with a contrast ratio of 500:1; in addition, its wide viewing angle was verified during its halftone display.

Furthermore, the liquid crystal display device of the present embodiment was quantitatively evaluated in terms of image burn-in and image persistence by using an oscilloscope combined with photodiodes. First, a window pattern was displayed at the highest luminance on the screen for 2 hours. Then, the liquid crystal display device was switched to the halftone display which made image sticking most noticeable; in this case, its was set such that the luminance level became 10% of its maximum over the entire screen. The time required for the edges of the window pattern to disappear was evaluated as the image sticking fading time. The image sticking fading time is required to be within 5 minutes. The measurement results were not longer than 1 minute over the operating temperature range (0 to 50 degrees C.). Also by visual image quality and image sticking check, high display performance was verified. Display unevenness attributable to image burn-in and image sticking persistence was not recognized at all.

It is conventionally said that although the photo-alignment can give liquid crystal alignment ability, the anchoring energy which anchors aligned liquid crystal molecules to the orientation control film is weak as compared with that obtained by the common rubbing alignment method. It is also said that if this anchoring energy is weak, the reliability of the liquid crystal display device as a product is insufficient. In particular, in the case of homogenous alignment, it is said that the azimuthal anchoring energy is more important than the polar anchoring energy.

Then, another liquid crystal cell having an alignment film formed on its glass substrate was fabricated to measure the strength of the twist coupling between liquid crystal molecules and the surface of the alignment film at the boundary face, or azimuthal anchoring energy $A_2$. The alignment film was formed from the same material by using the same process as in the liquid crystal display device described so far. The alignment film was also given the same alignment treatment. Also, the same liquid crystal composition as in that liquid crystal display device was enclosed therein. The measurement was made by the torque balance method (Hasegawa et al, Japanese Liquid Crystal Society Conference Proceedings 3B12 (2001), p. 251); the result was $8.5 \times 10^{-4}$ N/m.

Comparative Example

As a comparative example to verify the effect of the first embodiment, a liquid crystal display device was constructed. This liquid crystal display device is identical to that of the first embodiment except that a polyamide acid given by the following general formula (111) is used as the varnish resin to form the 70 nm-thick and about 80% thermally imidated orientation control films.

[Formula 111]

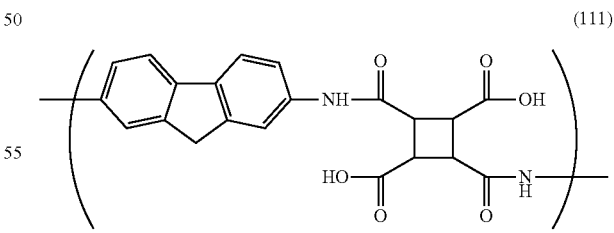

(111)

Its display quality was evaluated in the same manner as in the first embodiment. The viewing angle was found substantially as wide as that of the first embodiment, and the whole display area exhibited contrast ratios beyond 500:1. However, the image sticking fading time measured quantitatively in the same manner as in the first embodiment was about 30 minutes in the operating temperature range of 0 to 50 degrees C. Even by visual display quality and image sticking check, slow image sticking fading was recognized. The image sticking fading performance was not so high as that of the first embodiment. The azimuthal anchoring energy $A_2$ was about $5.5 \times 10^{-4}$ N/m.

Embodiment 2

Figure 3:
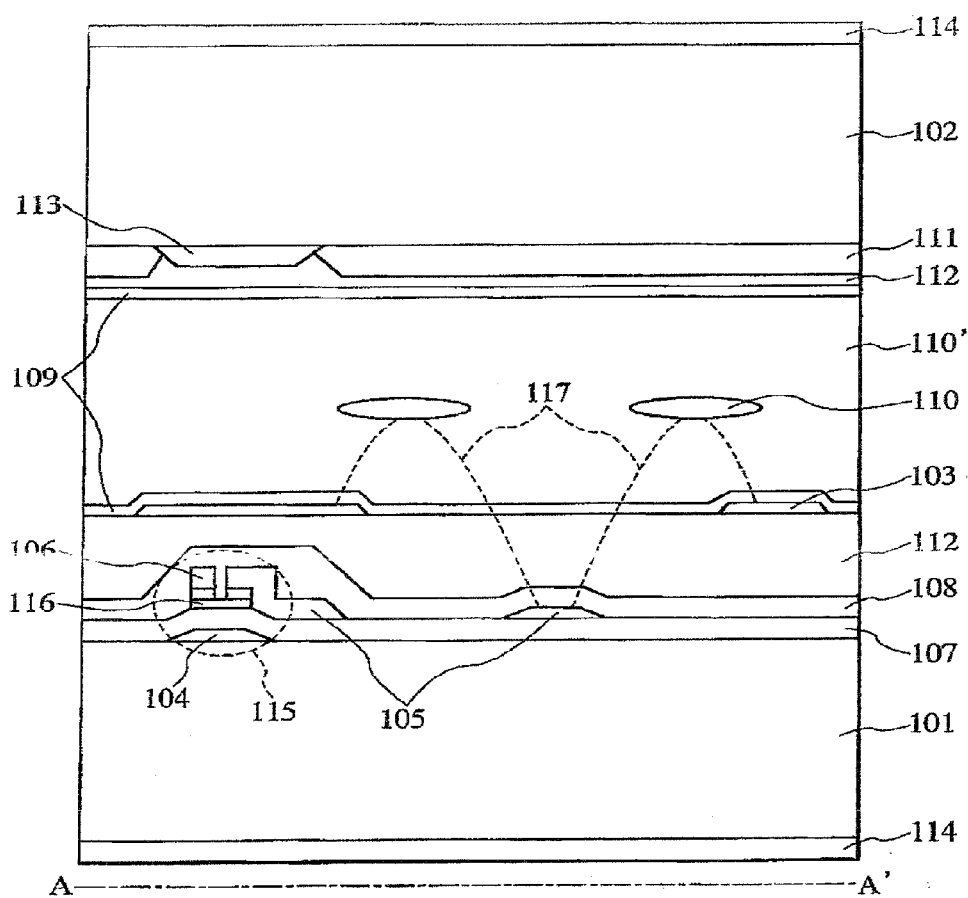
FIG. 3 depicts a cross-section of a pixel in Embodiment 2 for explaining how one pixel is constructed.
Figure 4A:
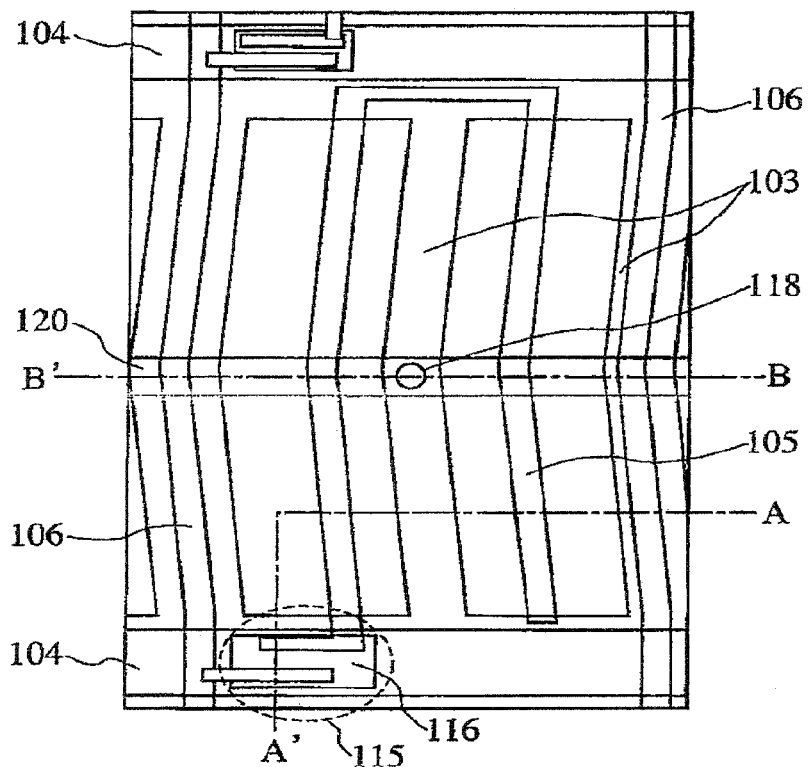
FIGS. 4A, 4B, and 4C depict a top view and cross-sections of the pixel for explaining how one pixel is constructed in Embodiment 2.
Figure 4B:
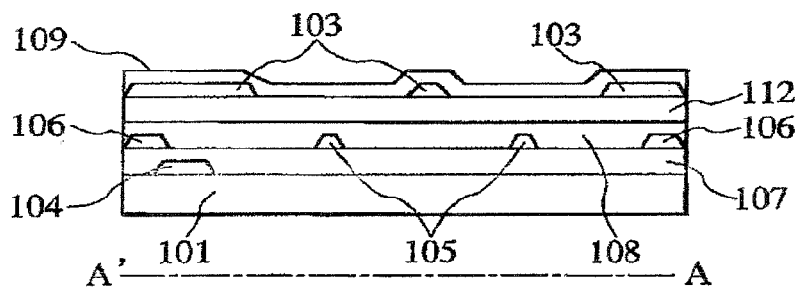
Figure 4C:
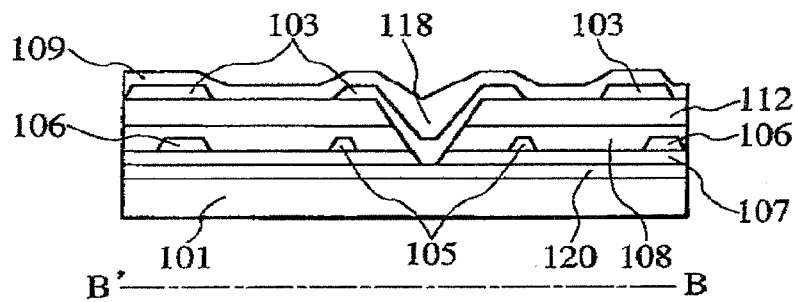

FIG. 3 schematically depicts a cross-section of one pixel and its vicinity in the liquid crystal display device of a second embodiment. FIG. 4 schematically depicts the active matrix substrate for explaining how each pixel is constructed in the liquid crystal display device of the second embodiment. FIG. 4A is its top view, FIG. 4B is a cross-section along line A-A' shown in FIG. 4A, and FIG. 4C is a cross-section along line B-B' shown in FIG. 4A. The cross-section shown in FIG. 3 corresponds to a part of the cross-section along line A-A' shown in FIG. 4A.

Note that since FIG. 4B and FIG. 4C are depicted schematically with emphasis on the structure of the relevant part, they do not completely agree with the actual cross-sections along lines A-A' and B-B' of FIG. 4A. For example, the semiconductor film 116 is not shown in FIG. 4B.

In the present embodiment, a gate electrode 104 and common electrode line 120, which are made of Cr (chromium), are disposed on a glass substrate 101 which constitutes the active matrix substrate. A gate insulating film 107 of silicon nitride is formed so as to cover the gate electrode 104 and common electrode line 120. On the gate electrode 104, a semiconductor film 116 of amorphous silicon or polysilicon is disposed via the gate insulating film 107. This semiconductor film 116 serves as the active layer of a thin film transistor (TFT) 115 as an active element.

In addition, a drain electrode 106 and source electrode (pixel electrode) 105, which are made of chromium.molybdenum, are disposed so as to partly overlap with the semiconductor film 116 pattern. A protective insulating film 108 of silicon nitride is formed so as to cover all of them. On this protective insulating film 108, an organic protect film 112 is disposed. This organic protect film 112 is made of, for example, acrylic resin or other transparent material. The pixel electrode 105 is made of ITO ($In_2O_3$:Sn) or other transparent material. The common electrode 103 is connected to the common electrode line 120 via a through hole 118 formed through the gate insulating film 107, protect film 108 and organic protect film 112.

The common electrode 103 is formed so as to two-dimensionally surround one pixel. The common electrode 103 forms a pair with the pixel electrode 105 in applying an electric field to drive liquid crystals. Also, the common electrode 103 is disposed on the organic protect film 112 so that when viewed from the top, it hides the lower drain electrode 106, scan line 104, and thin film transistor 115 constituting an active element. Thus, the common electrode 103 also serves as a light blocking layer for the semiconductor film 116.

An orientation control film 109 is formed on the top surface of the glass substrate 101 constituting the active matrix substrate having a matrix of thus-constructed unit pixels disposed thereon. That is, the orientation control film 109 is formed on the organic protect film 112 on which the common electrodes 103 are formed. The glass substrate 102 constituting the opposite substrate 102 is also provided with an orientation control film 109 on an organic protect film 112 which is formed on a color filter layer 111.

To these orientation control films 109, liquid crystal alignment ability is given by irradiating them with linearly polarized ultraviolet light obtained from a high-pressure mercury lamp (a light source) via a pile polarizer comprising a stack of quartz sheets as in the first embodiment.

The glass substrate 101 and the opposite glass substrate 102 are disposed so as to face each other via the orientation control films 109. Between them, a liquid crystal composition layer 110' composed of liquid crystals 110 is disposed. In addition, the glass substrate 101 and the opposite glass substrate 102 have polarizers 114 formed respectively on their outer surfaces.

Thus, similarly to the first embodiment described earlier, the pixel electrode 105 is disposed below the organic protect layer 112 and protective insulating layer 108 while the common electrode 103 is disposed on the organic protect layer 112 formed over the pixel electrode 105. The common electrode 103, if its electric resistivity is low enough, may be formed so as to serve both as a common electrode and a common electrode line. In that case, it is possible to omit the formation of the lowermost common electrode line 120 and the associated processing of the through hole 118.

In the present embodiment, as shown in FIG. 4A, each region enclosed by the lattice-shaped common electrode 103 constitutes one pixel, and the common electrode 103 and pixel electrode 105 are disposed so as to divide the pixel into four areas. In addition, the pixel electrode 105 and the opposed common electrode 103 forms a zigzag, bent structure with them disposed parallel to each other, so that one pixel is divided into multiple sub-pixels. This structure balances out the hue shifts in the pixel.

The following provides a description of how the liquid crystal display device of the second embodiment is manufactured. As the glass substrates 101 and 102, surface-polished 0.7-mm-thick glass substrates are used. The thin film transistor 115 is constructed from the pixel electrode (source electrode) 105, signal line (drain electrode) 106, scan line (gate electrode) 104, and amorphous silicon 116. The scan lines 104 were formed by patterning an aluminum film, the common electrode lines 120 and signal lines 106 were formed by patterning a chromium film. The pixel electrodes 105 were formed by patterning an ITO film. Except the scan lines 104, the electrode line patterns are bent zigzag by 10 degrees as shown in FIG. 4A. The gate insulating film 107 and the protective insulating film 108 are made of silicon nitride and both 0.3 μm in thickness.

Then, as shown in FIG. 4C, each cylindrical through hole 118 with a diameter of about 10 μm was formed down to the common electrode line 120 by a photolithography technique and etching process, and acrylic resin was applied thereon. An about 1-μm-thick organic protect film 112 with a dielectric constant of about 4 was formed as a transparent, insulative film by heating it for 1 hour at 220 degrees C. This organic protect film 112 planarizes the surface irregularities caused by the step of the pixel electrode 105 in the display region. Likewise, the other organic protect film 112 planarizes the surface irregularities of the boundary face of the color filter layer 111 between adjacent pixels.

Then, after the through hole 118 was re-etched to a diameter of about 7 μm, the common electrode 103 was formed thereon by patterning an ITO film for connection with the common electrode line 120. The space between the pixel electrode 105 and the common electrode 103 was 7 μm. Further, this common electrode 103 was arranged in such a lattice form that it enclosed the pixel by covering the lower signal line 106, scan line 104 and thin film transistor 115. Thus, the common electrode 103 serves also as a light blocking layer.

Accordingly, the pixel electrode 105 was arranged along the three bars of the common electrode 103 in the unit pixel as shown in FIG. 4A. Consequently, an active matrix substrate was obtained on which 1024×3×768 pixels were constructed from 1024×3 (for R, G and B sub-pixels) signal lines 106 and 768 scan lines 104.

In the present embodiment, the orientation control films 109 were formed from a polyamide acid trimethyl silyl ester varnish given by the following general formula (112). The prepared varnish is such that its resin content is 5% by weight, DMAc content is 60% by weight, γ-butyrolactone content is 20% by weight, and butylcellosolve content is 15% by weight. After the varnish was applied to the active matrix substrate by printing, thermal imidation was performed. Consequently, the varnish was imidated by about 80%, resulting in an about 60-nm-thick fine orientation control film 109 made of polyimide and polyamide acid alkyl silyl ester.

[Formula 112]

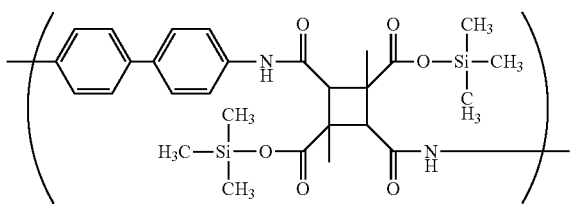

(112)

The process to impart alignment ability was similar to that for the first embodiment. The orientation control films ware irradiated with polarized ultraviolet light at an irradiation energy of about 3 J/cm². Also, thermal treatment was concurrently performed on the substrate at about 150 degrees C. by setting it on a hot plate while the orientation control film formed on the substrate was irradiated with polarized UV light.

Then, these two glass substrates were arranged so that the respective orientation control films 109 given the liquid crystal alignment ability faced each other via scattered spacers of globular polymer beads. By coating their peripheral sections with a sealing agent, they were assembled into a liquid crystal display panel. The liquid crystal alignment directions of the two glass substrates are substantially in parallel to each other.

Into this liquid crystal display panel evacuated, the nematic liquid crystal composition A was injected. Its dielectric anisotropy Δε is a positive value of 10.2 (1 kHz, 20 degrees C.); anisotropic refractive index Δn is 0.075 (wavelength 590 nm, 20 degrees C.); torsional elastic constant K is 7.0 pN; and nematic-to-isotropic phase transition temperature T (N–I) is about 76 degrees C. After that, the panel was sealed with UV-curable resin. The liquid crystal layer's thickness (gap) is 4.2 μm. The retardation (Δnd) of this liquid display panel is about 0.31 μm.

Measuring the pretilt angles of the liquid crystals by the crystal rotation method using another homogeneously-aligned liquid crystal display panel which was constructed by using substantially the same orientation control film and liquid crystal composition as those used for the above panel revealed that they were about 0.2 degrees. Then, the liquid crystal panel was sandwiched by two polarizers 114 such that the optical transmission axis of one polarizer was substantially parallel to the liquid crystal orientation direction while that of the other was orthogonal to the liquid crystal orientation direction. Then, the liquid crystal display panel was connected with a drive circuit, backlight, and the like to construct a modular active matrix liquid crystal display device. The present embodiment employed the normally closed switching mechanism in which dark display is provided at low voltage, and bright display is provided at high voltage.

Then, the display quality of the liquid crystal display device of the present embodiment was evaluated. The liquid crystal display device was verified to have a higher aperture ratio and a higher contrast ratio (600:1) than those of the first embodiment. Its wide viewing angle was also verified during its halftone display. In addition, this liquid crystal display device was quantitatively evaluated in terms of the image sticking fading time in the same manner as in the first embodiment. The image sticking fading time was measured to be about 1 minute in the operating temperature range from 0 to 5 degrees C. Also by visual image quality and image sticking check, display unevenness attributable to image burn-in and image sticking persistence was not recognized at all. The display performance was as high as that of the first embodiment.

Embodiment 3

Figure 5:
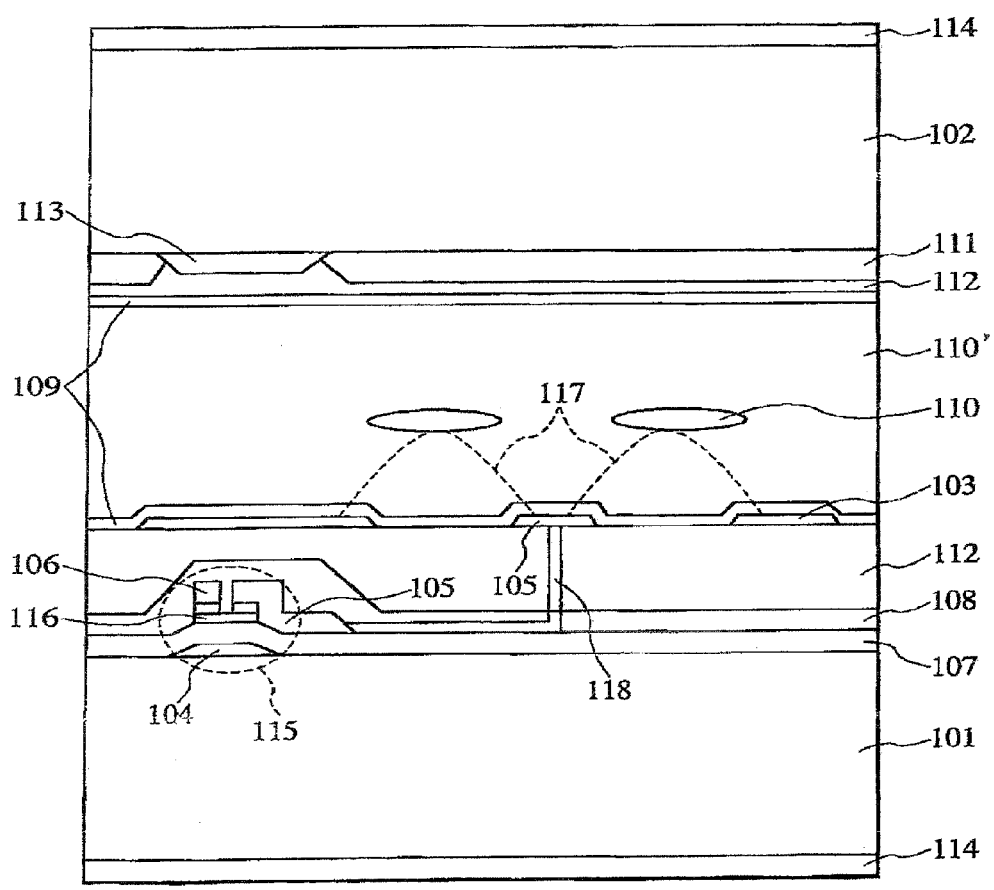
FIG. 5 depicts a cross-section of a pixel in Embodiment 3 for explaining how one pixel is constructed.

FIG. 5 schematically depicts a cross-section of one pixel and its vicinity in the liquid crystal display device of a third embodiment. Note that in the drawing, the same reference numerals as those of the previous embodiments denote functionally identical parts. In the present embodiment as shown in FIG. 5, the pixel electrode 105 disposed below the protective insulating film 108 is extended upward across the organic protect film 112 via a through hole 118 to the same level as the common electrode 103. In the case of this construction, it is possible to further lower the liquid crystal drive voltage.

In the TFT liquid crystal display device as constructed above, when no electric field is applied, the liquid crystal molecules 110 constituting the liquid crystal composition layer 110' are substantially parallel to the mutually facing substrates 101 and 102 and oriented homogeneously in the direction defined initially by the photo-alignment process. If the TFT 115 is turned on by applying voltage to the gate electrode 104, an electric field 117 is applied to the liquid crystal composition layer 110' due to the potential difference between the pixel electrode 105 and the common electrodes 103. Accordingly, the orientation of the liquid crystals 110 is changed toward the direction of the electric field due to the interaction between the dielectric anisotropy of the liquid crystals and the electric field. Utilizing the refractive anisotropy of the liquid crystal layer 110' and the polarizers 114 at this time enables changing the transmittance of the liquid crystal display device in implementing display.

The following provides a description of how the liquid crystal display device of the third embodiment is manufactured. As the glass substrates 101 and 102, surface-polished 0.7-mm-thick glass substrates are used. The thin film transistor 115 is constructed from the pixel electrode (source electrode) 105, signal line (drain electrode) 106, scan line (gate electrode) 104, and amorphous silicon 116. The scan electrodes 104 are formed by patterning an aluminum film. The common electrode lines 120, signal lines 106, and pixel electrodes 105 are formed by patterning a chromium film. The gate insulating film 107 and the protective insulating film 108 are made of silicon nitride and both 0.3 μm in thickness. After acrylic resin is applied thereon, thermal treatment is done at 220 degrees C. for 1 hour to form an about 1.0-μm-thick, transparent, insulative organic protect film 112 with a dielectric constant of about 4. This organic protect film 112 planarizes the surface irregularities caused by the step of the pixel electrode 105 in the display region and those between adjacent pixels.

Then, the cylindrical through hole 118 with a diameter of about 10 µm is formed down to the lower source electrode 105 by a photolithography technique and etching process as shown in FIG. 5. By patterning an ITO film, the pixel electrode 105 is then formed thereon for connection with the source electrode 105. In addition, an about 10-µm-wide cylindrical though hole is formed on the common electrode line 120. The common electrode 103 is formed thereon by patterning an ITO film. There is a space of 7 µm between the pixel electrode 105 and the common electrode 103. Except the scan lines 104, the electrode line patterns are bent zigzag by 10 degrees. Further, this common electrode 103 is arranged in such a lattice form that it encloses the pixel by covering the lower signal line 106, scan line 104, and thin film transistor 115. Thus, the common electrode 103 serves also as a light blocking layer.

Accordingly, similarly to the second embodiment except that two kinds of through holes are formed in the unit pixel, the pixel electrode 105 is arranged along the three bars of the common electrode 103. Consequently, an active matrix substrate is obtained on which 1024×3×768 pixels are constructed from 1024×3 (for R, G and B sub-pixels) signal lines 106 and 768 scan lines 104.

As shown in FIG. 5, except for the pixel structure and the orientation control films, the liquid crystal display device of the present embodiment is the same as that of the second embodiment. In the present embodiment, the orientation control films 109 are formed from a polyamide acid ester varnish given by the following general formula (115). The prepared varnish is such that its resin content is 5% by weight, DMAc content is 60% by weight, γ-butyrolactone content is 20% by weight, and butylcellosolve content is 15% by weight. After the varnish is applied to the substrate by printing, thermal imidation is performed. The varnish is imidated by about 80%, resulting in the formation of an about 80-nm-thick fine orientation control film 109 made of polyimide and polyamide acid ester.

[Formula 115]

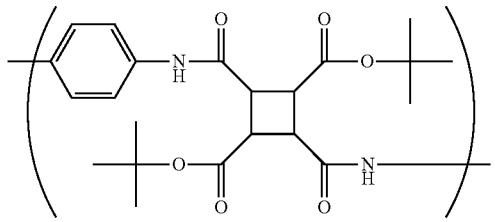

(115)

The process to impart alignment ability is similar to that for the first embodiment. The alignment films are irradiated with polarized ultraviolet light at an energy rate of about 6 J/cm². Also, thermal treatment is concurrently performed at about 180 degrees C. on the substrate by setting it on a hot plate while the orientation control film formed on the substrate is irradiated with polarized UV light.

The display quality of the liquid crystal display device of the present embodiment was evaluated. Its display quality was as high as that of the first embodiment. Its wide viewing angle was also verified during its halftone display. In addition, this liquid crystal display device was quantitatively evaluated in terms of the image sticking fading time in the same manner as in the first embodiment. The image sticking fading time was measured to be about 1 minute or shorter. Also by visual image quality and image sticking check, high display performance was recognized; specifically, display unevenness attributable to image burn-in and image sticking persistence was not recognized at all.

If the pixel electrode 105 connected directly with the TFT 115 is in contact with the orientation control film 109 formed on the top of the substrate as shown in FIG. 5, ordinary rubbing alignment treatment may damage the TFT 115 which is subject to frictionally charged electricity via the pixel electrode near the surface. In the case of such an arrangement, rubbingless photo-alignment treatment, as in the present embodiment, is very effective.

Embodiment 4

Figure 6:
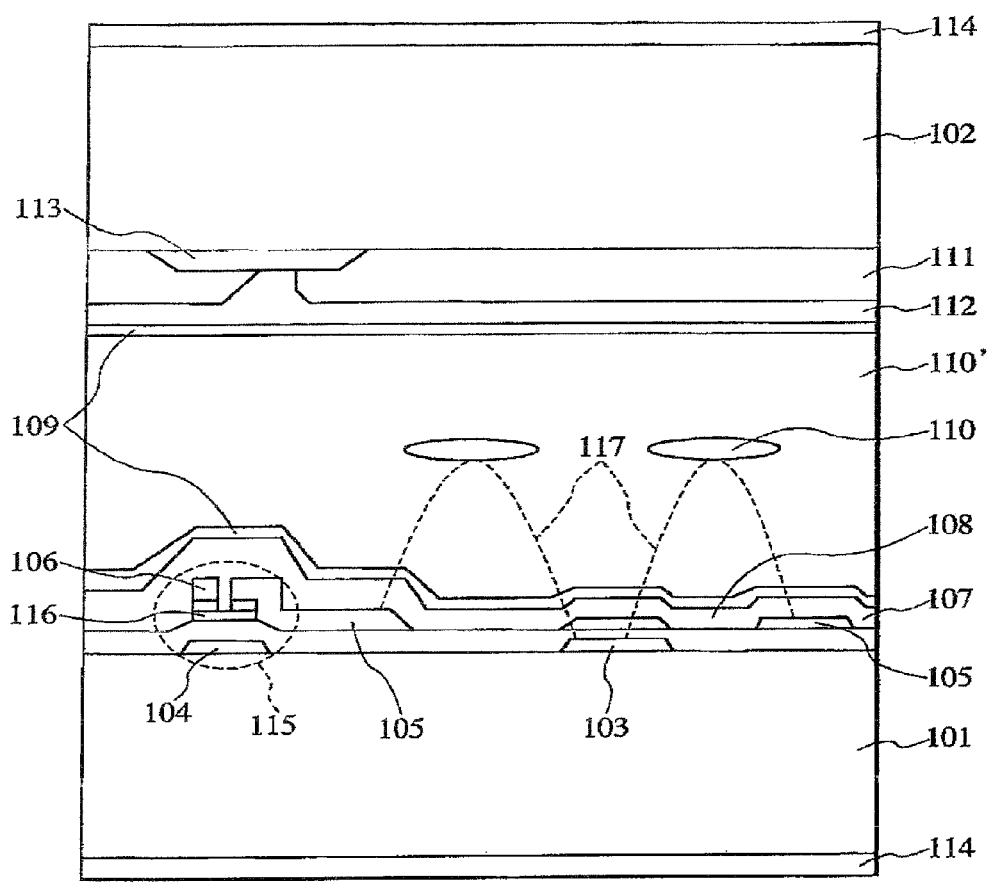
FIG. 6 depicts a cross-section of a pixel in Embodiment 4 for explaining how one pixel is constructed.

FIG. 6 schematically depicts a cross-section of one pixel and its vicinity in the liquid crystal display device of a fourth embodiment. In the drawing, the same reference numerals as those of the previous embodiments denote functionally identical parts. The structure of the present embodiment has large steps due to electrodes and the like. As shown in FIG. 6, the gate electrode 104 of the thin film transistor 115 and the common electrode 103 are formed in the same layer. The orientation of the liquid crystals 110 is changed toward the electric field 117 between the common electrode 103 and the pixel electrode 105.

Note that each embodiment mentioned so far may be configured to have a plurality of display regions per pixel by forming a common electrode 103 and a pixel electrode 105 for each display region. If plural sets are thus formed, it is possible to shorten the pixel electrode 105 to common electrode 103 distance. Therefore, this structure is very effective in lowering the liquid crystal drive voltage when each pixel is large.

Also note that, in light of fabrication easiness and reliability, it is not necessary but preferable in each embodiment described so far to use ion-doped titanium oxide or ion-doped zinc oxide as in ITO (indium tin oxide) as the material of a transparent conductive film which constitutes the pixel electrodes and/or common electrodes.

In the manufacture method of the liquid crystal display device of the fourth embodiment, surface-polished 0.7-mm-thick glass substrates are used as the glass substrates 101 and 102. The thin film transistor 115 is constructed from the pixel electrode (source electrode) 105, signal line (drain electrode) 106, scan line (gate electrode) 104, and amorphous silicon 116. The scan electrode 104, common electrode line 120, signal line 106, pixel electrode 105, and common electrode 103 are all formed by patterning a chromium film. The pixel electrode 105 to common electrode 103 space is 7 µm. The gate insulating film 107 and the protective insulating film 108 are made of silicon nitride and both 0.3 µm in thickness.

In the present embodiment, the orientation control films 109 are formed from a mixed resin containing a polyamide acid ester given by the following general formula (118) and a polyamide acid given by the following general formula (119) at a weight ratio of 7:3. The prepared mixed resin is such that its resin content is 5% by weight, DMAc content is 60% by weight, γ-butyrolactone content is 20% by weight, and butylcellosolve content is 15% by weight. After the mixed resin is applied to the substrate by printing, thermal imidation is performed. The mixture was imidated by about 80%, resulting in the formation of an about 100-nm-thick fine orientation control film 109 made of polyimide and polyamide ester.

[Formula 118]

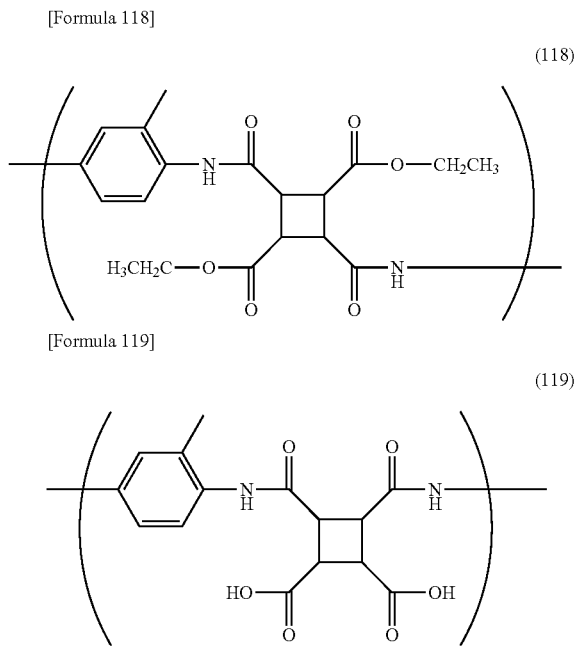

(118)

[Formula 119]

(119)

The measured resistivity of this orientation control film was $1.5 \times 10^{15}$ Ωcm.

Then, the orientation control film is given photo-alignment treatment. Specifically, the film is irradiated with polarized UV light having 220 to 380 nm wavelengths at an irradiation energy rate of about 3 J/cm² while irradiated concurrently with infrared light. The polarized UV light is obtained from a high-pressure mercury lamp via an interference filter and a pile polarizer comprising a stack of quartz sheets. By this, an active matrix substrate provided thereon with 1024×3 (for R, G and B sub-pixels) signal lines 106 and 768 scan lines 104 to drive 1024×3×768 pixels is completed.

The liquid crystal display device of the present embodiment constructed as describe above, shown in FIG. 6, is the same as that of the first embodiment except for the pixel structure.

The display quality of the liquid crystal display device of the present embodiment was evaluated. Its display quality was as high as that of the first embodiment. Its wide viewing angle was also verified during its halftone display. In addition, this liquid crystal display device was quantitatively evaluated in terms of the image sticking fading time in the same manner as in the first embodiment. The image sticking fading time was below 3 minutes. Also by visual image quality and image sticking check, defective display attributable to image burn-in and image sticking persistence was not recognized.

In addition, another liquid crystal display device was constructed. This liquid crystal display device is the same as that of the former example except that only the polyamide acid ester given by the following general formula (118) is used as the varnish resin for the orientation control film.

[Formula 118]

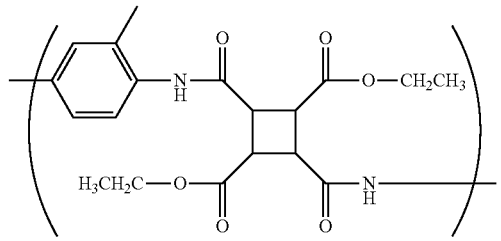

(118)

The measured resistivity of this orientation control film was $6.0 \times 10^{15}$ Ωcm.

The display quality of this example was evaluated. The display quality was as high as that of the former example. Its wide viewing angle was also verified during its halftone display. Then, this sample was quantitatively evaluated in terms of the image sticking fading time in the same manner as in the former example. The image sticking fading time was 5 minutes or shorter, which is somewhat longer than that of the former example. However we confirmed this sample provides enough performance for the problems to be resolved by this invention.

Embodiment 5

Figure 7:
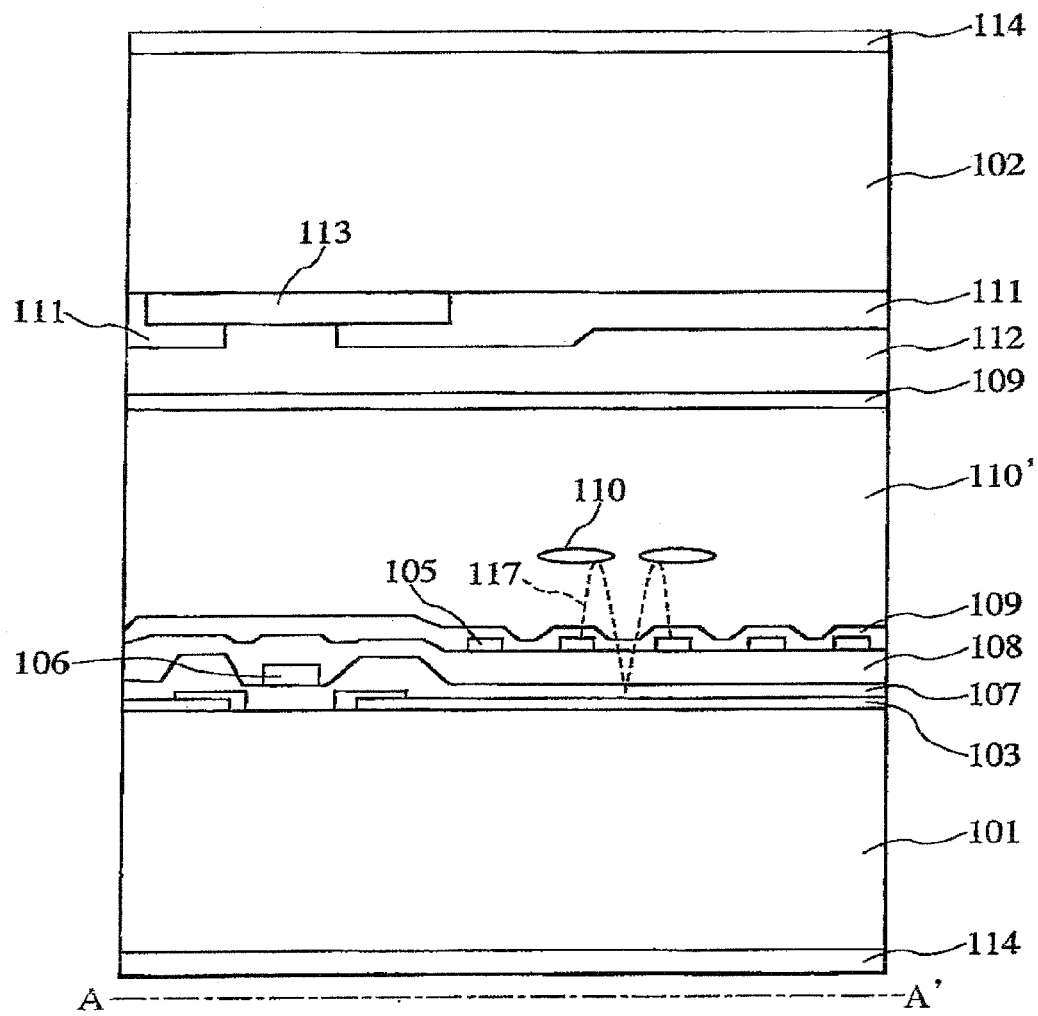
FIG. 7 depicts a cross-section of a pixel in Embodiment 5 for explaining how one pixel is constructed.

FIG. 7 schematically depicts a cross-section of one pixel and its vicinity in the liquid crystal display device of a fifth embodiment. In the drawing, the same reference numerals as those of the previous embodiments denote functionally identical parts. In the present embodiment, the pixel electrode 105 and common electrode 103 are made of ITO. The common electrode 103 is designed to be so flat and wide as to occupy substantially the whole area of the pixel. This construction can raise the aperture ratio since the portion above the electrode can be utilized as a light-transmissive portion. In addition, it is possible to effectively apply an electric field since the inter-electrode space can be shortened.

Figure 8:
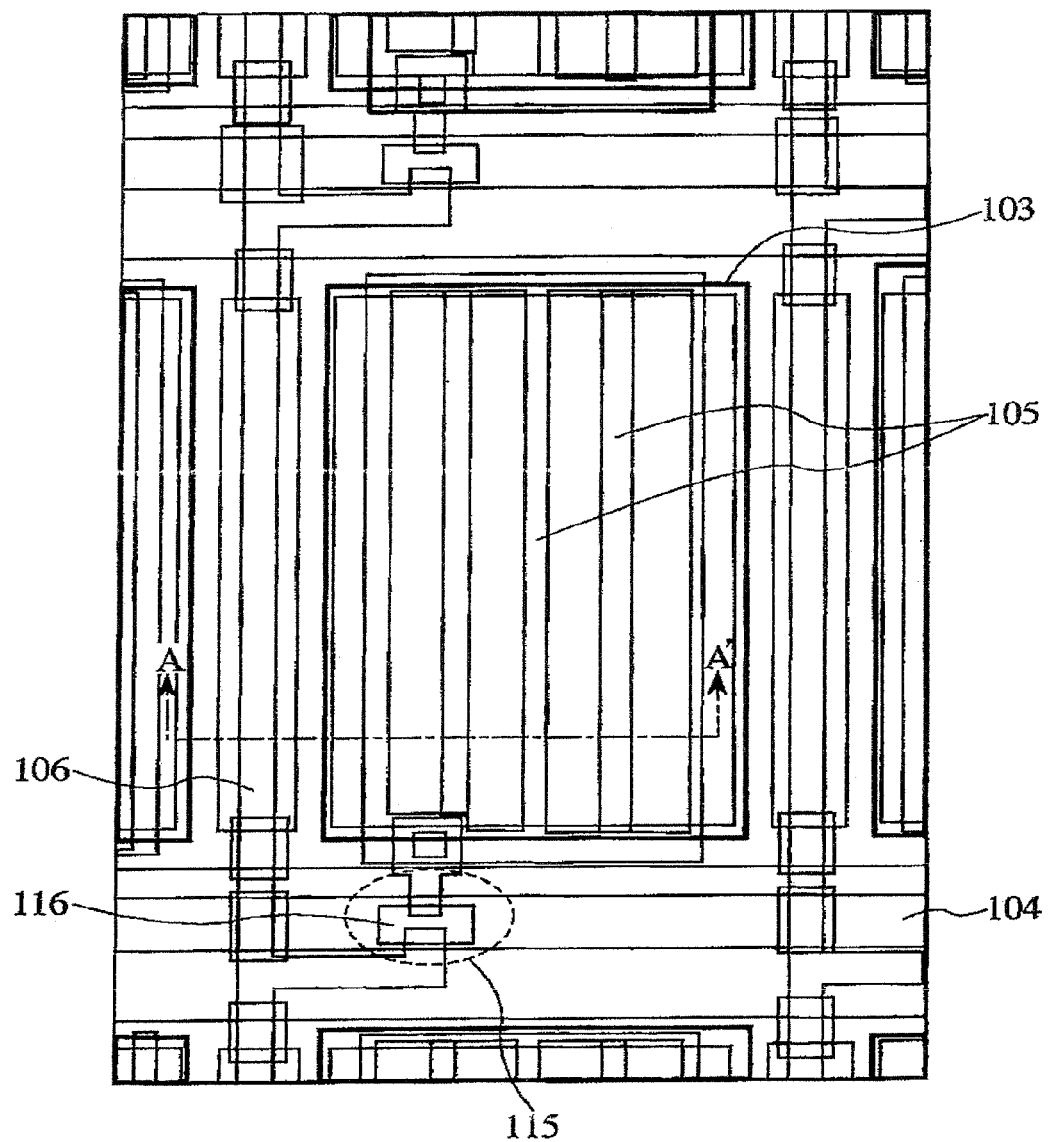
FIG. 8 depicts a top view of the pixel for explaining how one pixel is constructed in Embodiment 5.

FIG. 8 schematically depicts an active matrix substrate of the present embodiment for explaining how a thin film transistor 115, common electrode 103, pixel electrode 105, and signal line 106 are structured to construct one pixel.

In the manufacture method of the liquid crystal display device of the present embodiment, a surface-polished 0.7-mm-thick glass substrate is used as the glass substrates 101. The glass substrate 101 is formed into a TFT substrate on which are formed common electrodes 103, pixel electrodes 105, signal lines 106, scan lines 104, a gate insulating film 107 to prevent short-circuits between the signal lines 106 and the scan lines 104, thin film transistors 115, pixel electrodes 105, signal lines 106, and a protective insulating film 108 to protect the pixel electrodes 105 and signal lines 106.

The TFT 115 is constructed from the pixel electrode (source electrode) 105, signal line (drain electrode) 106, scan line (gate electrode) 104, and amorphous silicon 116. The scan line (gate electrode) 104 is formed by patterning an aluminum film; the signal line (drain electrode) 106 formed by patterning a chromium film; and the common electrode 103 and pixel electrode 105 formed by patterning ITO.

The gate insulating film 107 and the protective insulating film 108 are made of silicon nitride and are 0.2 μm and 0.3

μm in thickness, respectively. Capacitive elements are formed by sandwiching the gate insulating film 107 and protective insulating film 108 between the pixel electrode 105 and common electrode 103.

The pixel electrode 105 is disposed on an upper-layer of the flat common electrode 103. 1024×3×768 pixels are constructed from 1024×3 (for R, G and B sub-pixels) signal lines 106 and 768 scan lines 104.

The substrate 102 is the opposite color filter substrate on which a color filter 113 provided with a black matrix 113 is formed as in the first embodiment.

Then, the orientation control films 109 are formed from a resin containing a polyamide acid ester given by the following general formula (120). The prepared resin is such that its resin content is 5% by weight, DMAc content is 60% by weight, γ-butyrolactone content is 20% by weight, and butylcellosolve content is 15% by weight. After the resin is applied to the substrate by printing, thermal imidation is performed. The resin is imidated by about 80%, resulting in an about 110-nm-thick fine orientation control film 109 made of polyimide and polyamide acid ester.

[Formula 120]

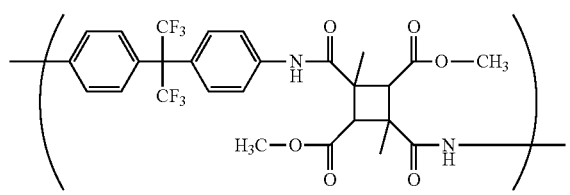

(120)

The measured resistivity of this orientation control film was 4.5×10$^{15}$ Ωcm.

Likewise, the same polyamide acid ester varnish is printed on the surface of the other glass substrate 102 having an ITO film formed thereon, and the varnish is thermally imidated by about 80%, resulting in an about 110-nm-thick fine orientation control film 109 made of polyimide and polyamide acid ester.

In order to impart liquid crystal alignment ability to the surface of each orientation control film 109, the films were irradiated with polarized UV (ultraviolet) light together with infrared light. As the light source, a high-pressure mercury lamp was used. The UV light in the range of 240 nm to 380 nm was extracted and linearly polarized to a polarization ratio of about 10:1 through a pile polarizer comprising a stack of quartz sheets. Irradiation energy was given at a rate of about 2.5 J/cm$^2$. The temperature of each orientation control film was about 180 degrees C. during the irradiation. Consequently, it was found that liquid crystal molecules on the surfaces of the orientation control films were oriented orthogonal to the polarization direction of the radiated UV light.

The liquid crystal alignment directions of the orientation control films 109 of the TFT and color filter substrates were parallel to each other. With polymer-bead spacers with an average grain size of 4 μm scattered between the TFT substrate and the color filter substrate, liquid crystal molecules 110 were injected between these two glass substrates. As the liquid crystals 110, the same liquid crystal composition A as in the first embodiment was used.

Two polarizers 114 which sandwich the TFT substrate and color filter substrate are set in a crossed-Nicol state. The normally closed switching mechanism is employed in which dark display is provided at low voltage, and bright display is provided at high voltage.

Then, the display quality of the liquid crystal display device of the present embodiment was evaluated. Its image quality was verified to have a higher aperture ratio and a higher contrast ratio of 700:1 than those of the first embodiment. Its wide viewing angle was also verified during its halftone display. In addition, this liquid crystal display device was quantitatively evaluated in terms of the image sticking fading time in the same manner as in the first embodiment. The image sticking fading time was about 5 minutes in the operating temperature range of 0 to 50 degrees C. Also by visual image quality and image sticking check, display unevenness attributable to image burn-in and image persistence was not recognized at all. The display performance was as high as that of the first embodiment.

Embodiment 6

The liquid crystal display device of a sixth embodiment is the same as that of the fifth embodiment except that the orientation control film 109 is formed from a copolymer varnish which is a polymer chain given by the following general formula (120) including about 20% of a polyamide acid ester given by the general formula (125).

[Formula 125]

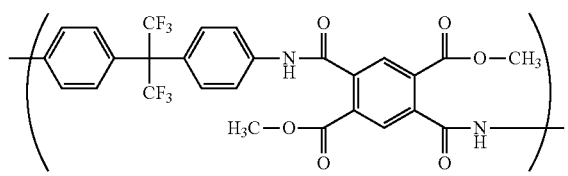

(125)

The measured resistivity of this orientation control film was 5.2×10$^{14}$ Ωcm.

Then, the display quality of the liquid crystal display device of the present embodiment was evaluated. Its high image quality was verified with a high contrast ratio of 690:1. Its wide viewing angle was also verified during its halftone display. In addition, this liquid crystal display device was quantitatively evaluated in terms of the image sticking fading time in the same manner as in the first embodiment. The image sticking fading time was 3 minutes in the operating temperature range of 0 to 50 degrees C. Also by visual image quality and image sticking check, display unevenness attributable to image burn-in and image persistence was not recognized at all. The display performance was very high.

Embodiment 7

The liquid crystal display device of a seventh embodiment is the same as that of the fifth embodiment except that the orientation control film 109 is formed from a polyamide acid ester varnish given by the following general formula (123).

[Formula 123]

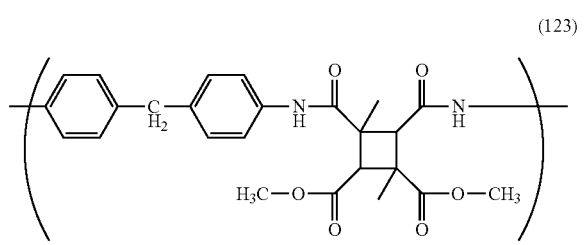

(123)

The measured resistivity of this orientation control film was $5.7 \times 10^{15}$ Ωcm.

Then, the display quality of the liquid crystal display device of the present embodiment was evaluated. Its high image quality was verified with a high contrast ratio of 730:1. Its wide viewing angle was also verified during its halftone display. In addition, this liquid crystal display device was quantitatively evaluated in terms of the image sticking fading time in the same manner as in the first embodiment. The image sticking fading time was 5 minutes in the operating temperature range of 0 to 50 degrees C. Also by visual image quality and image sticking check, display unevenness attributable to image burn-in and image persistence was not recognized at all. The display performance was very high.

Embodiment 8

The liquid crystal display device of an eighth embodiment is the same as that of the fifth embodiment except that the orientation control film 109 is formed from a mixed varnish containing polyamide acid esters given respectively by the following general formulae (123) and (124) at a weight ratio of 7:3.

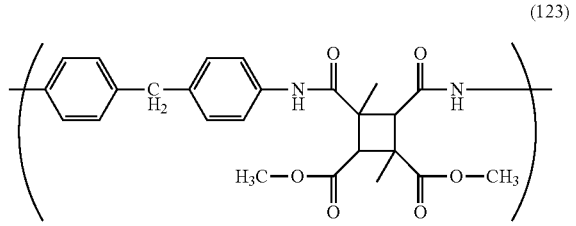

(123)

The measured resistivity of this orientation control film was $2.5 \times 10^{14}$ Ωcm.

Then, the display quality of the liquid crystal display device of this embodiment was evaluated. Its high image quality was verified with a high contrast ratio of 710:1. Its wide viewing angle was also verified during its halftone display. In addition, this liquid crystal display device was quantitatively evaluated in terms of the image sticking fading time in the same manner as in the first embodiment. The image sticking fading time was 3 minutes in the operating temperature range of 0 to 50 degrees C. Also by visual image quality and image sticking check, display unevenness attributable to image burn-in and image persistence was not recognized at all. The display performance was very high.

Embodiment 9

The liquid crystal display device of a ninth embodiment is the same as that of the first embodiment except that the orientation control film 109 is formed from a copolymer varnish which is a polymer chain given by the following general formula (120) including about 15% of a polyamide acid ester given by the general formula (126).

[Formula 126]

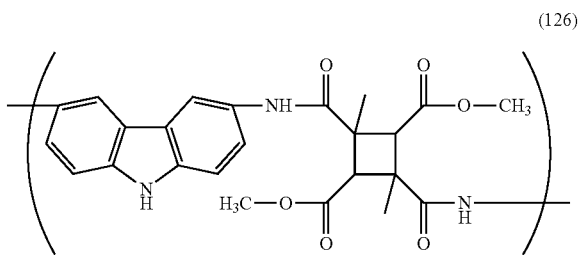

(126)

The measured resistivity of this orientation control film was $7.1 \times 10^{14}$ Ωcm.

Then, the display quality of the liquid crystal display device of the present embodiment was evaluated. Its high image quality was verified with a high contrast ratio of 730:1. Its wide viewing angle was also verified during its halftone display. In addition, this liquid crystal display device was quantitatively evaluated in terms of the image sticking fading time in the same manner as in the first embodiment. The image sticking fading time was 3 minutes in the operating temperature range of 0 to 50 degrees C. Also by visual image quality and image sticking check, display unevenness attributable to image burn-in and image persistence was not recognized at all. The display performance was very high.

What is claimed is:

1. A liquid crystal display device comprising:
   a pair of substrates, at least one of which is transparent;
   a liquid crystal layer disposed between the pair of substrates;
   a group of electrodes formed on at least one of the pair of substrates to apply an electric field to the liquid crystal layer;
   plural active elements connected to the group of electrodes; and
   a photo sensitive orientation control film for liquid crystal disposed on at least one of the pair of substrates;
   wherein said photo sensitive orientation control film is made of a polyimide, a first compound, and a second compound;
   wherein the first compound contains a polymer unit given by the following formula (102), (103), (113), (114), (116), or (117);
   wherein the second compound contains a polymer unit given by the following formula (102), (103), (113), (114), (116), (117), (121), or (122) wherein the cyclobutane section is replaced with a section given by at least one of the following formulae (51) through (55):

[Formula 102]

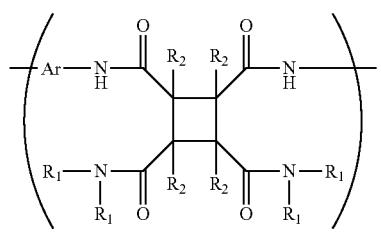
(102)

[Formula 103]

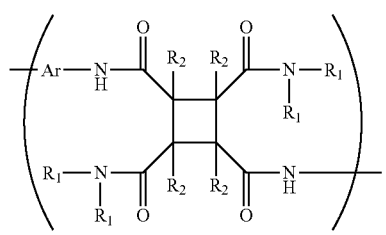
(103)

wherein each $R_1$ is individually hydrogen or an alkyl group containing 1 to 8 carbon atoms, each $R_2$ is individually a hydrogen atom, a fluorine atom, a chlorine atom, a bromine atom, a phenyl group, an alkyl group containing 1 to 6 carbon atoms, an alkoxy group containing 1 to 6 carbon atoms, a vinyl group (—$(CH_2)$m-CH=$CH_2$, m=0, 1, 2), or an alkynyl group (—$(CH_2)$m-C≡CH, m=0, 1, 2), and Ar is an aromatic compound;

[Formula 113]

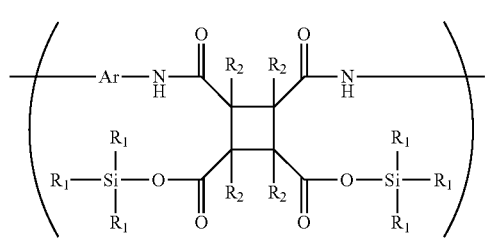
(113)

[Formula 114]

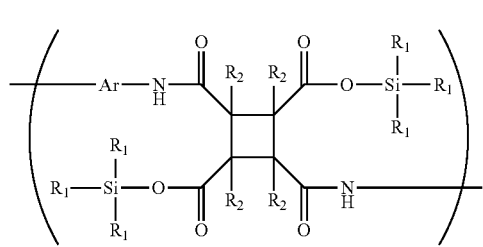
(114)

wherein each $R_1$ is individually hydrogen or an alkyl group containing 1 to 8 carbon atoms, each $R_2$ is individually a hydrogen atom, a fluorine atom, a chlorine atom, a bromine atom, a phenyl group, an alkyl group containing 1 to 6 carbon atoms, an alkoxy group containing 1 to 6 carbon atoms, a vinyl group (—$(CH_2)$m-CH=$CH_2$, m=0, 1, 2), or an alkynyl group (—$(CH_2)$m-C≡CH, m=0, 1, 2), and Ar is an aromatic compound;

[Formula 116]

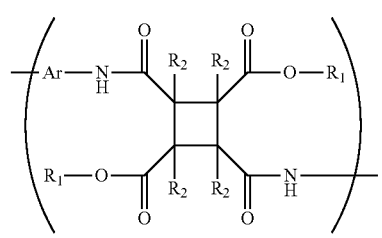
(116)

[Formula 117]

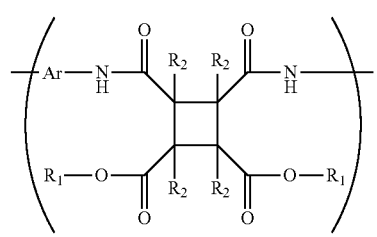
(117)

wherein each $R_1$ is individually an alkyl group containing 1 to 8 carbon atoms, each $R_2$ is individually a hydrogen atom, a fluorine atom, a chlorine atom, a bromine atom, a phenyl group, an alkyl group containing 1 to 6 carbon atoms, an alkoxy group containing 1 to 6 carbon atoms, a vinyl group (—$(CH_2)$m-CH=$CH_2$, m=0, 1, 2), or an alkynyl group (—$(CH_2)$m-C≡CH, m=0, 1, 2), and Ar is an aromatic compound;

[Formula 121]

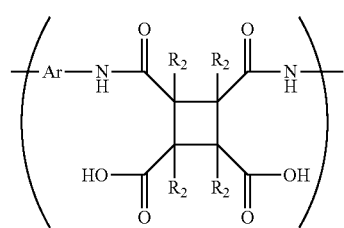
(121)

[Formula 122]

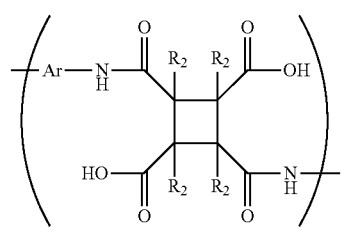
(122)

wherein each $R_2$ is individually a hydrogen atom, a fluorine atom, a chlorine atom, a bromine atom, a phenyl group, an alkyl group containing 1 to 6 carbon atoms, an alkoxy group containing 1 to 6 carbon atoms, a vinyl group (—$(CH_2)$m-CH=$CH_2$, m=0, 1, 2), or an alkynyl group (—$(CH_2)$m-C≡CH, m=0, 1, 2), and Ar is an aromatic compound;

[Formula 51]

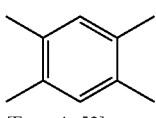
(51)

[Formula 52]

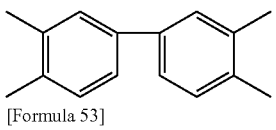
(52)

[Formula 53]

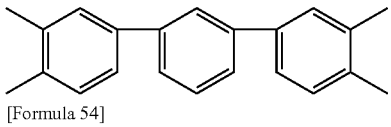
(53)

[Formula 54]

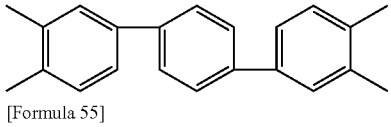
(54)

[Formula 55]

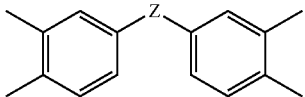
(55)

wherein: each hydrogen atom of the aromatic rings individually may instead be a fluorine atom, a chlorine atom, a bromine atom, a phenyl group, an alkyl group containing 1 to 8 carbon atoms, an alkoxy group, a vinyl group, or an alkynyl group; and Z is any of the following functional groups, (—CH$_2$—, —CO$_2$—, —NH—, —O—, —S—, —SO—, —SO$_2$—), wherein each hydrogen atom may instead be a fluorine atom, a chlorine atom, a bromine atom, a phenyl group, an alkyl group containing 1 to 8 carbon atoms, an alkoxy group, a vinyl group or an alkynyl group.

2. The liquid crystal display device according to claim 1, wherein the aromatic compound Ar contains at least one of those given by the following formulae (1) through (11);

[Formula 1]

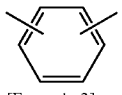
(1)

[Formula 2]

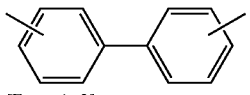
(2)

[Formula 3]

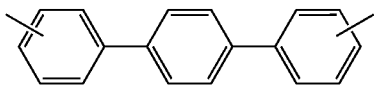
(3)

[Formula 4]

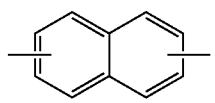
(4)

[Formula 5]

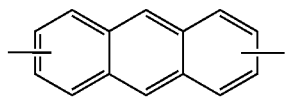
(5)

[Formula 6]

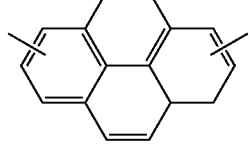
(6)

[Formula 7]

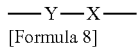
(7)

[Formula 8]

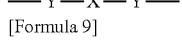
(8)

[Formula 9]

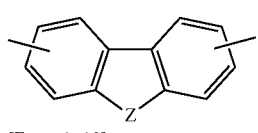
(9)

[Formula 10]

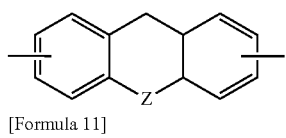
(10)

[Formula 11]

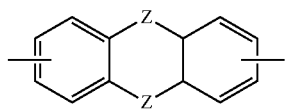
(11)

wherein: each hydrogen atom of the aromatic rings individually may instead be a fluorine atom, a chlorine atom, a bromine atom, a phenyl group, an alkyl group containing 1 to 8 carbon atoms, an alkoxy group, a vinyl group, or an alkynyl group; X is an alkyl group containing 1 to 8 carbon atoms, an alkoxy group, a vinyl group, an alkynyl group, or an alkyl group containing 0 to 8 carbon atoms and any of the following functional groups, (—O—, —CO—, —COO—, —S—, —SO—, —SO$_2$—, —NH—, —N=N—, phenyl group); Y is an aromatic ring such as a phenyl group, a naphthyl group, an anthracene group, or a pyrene group wherein each hydrogen atom of the aromatic ring individually may instead be a fluorine atom, a chlorine atom, a bromine atom, a phenyl group, an alkyl group containing 1 to 8 carbon atoms, an alkoxy group, a vinyl group, or an alkynyl group; and Z is any of the following functional groups, (—CH$_2$—, —CO$_2$—, —NH—, —O—, —S—, —SO—, —SO$_2$—), wherein each hydrogen atom may instead be a fluorine atom, a chlorine atom, a bromine atom, a phenyl group, an alkyl group containing 1 to 8 carbon atoms, an alkoxy group, a vinyl group, or an alkynyl group.

3. The liquid crystal display device according to claim 1, wherein two of R$_2$ are methyl groups and two of R$_2$ are hydrogen atoms in the above formula (102), (103), (113), (114), (116), or (117) for the first compound.

4. The liquid crystal display device according to claim 1, wherein the second compound contains the polymer unit given by the above formula (121) or (122).

5. The liquid crystal display device according to claim 1, wherein the electric field applied to the liquid crystal layer has a component which is substantially parallel to the surface of a substrate on which the group of electrodes is formed.

6. The liquid crystal display device according to claim 1, wherein the longitudinal direction of liquid crystals constituting the liquid crystal layer on the photo sensitive orientation control film is parallel or orthogonal to the polarization axis of the substantially linearly polarized light.

7. The liquid crystal display device according to claim 1, wherein the retardation $\Delta n \cdot d$ of the liquid crystal layer satisfies the condition of $0.2 \ \mu m \leq \Delta n \cdot d \leq 0.5 \ \mu m$ where $\Delta n$ and d respectively represent the refractive anisotropy and thickness of the liquid crystal layer.

8. The liquid crystal display device according to claim 1, wherein the dielectric anisotropy $\Delta \epsilon$ of the liquid crystal molecules in the liquid crystal layer is positive.

9. The liquid crystal display device according to claim 1, wherein the pretilt angles of the liquid crystal molecules of the liquid crystal layer are not larger than 1 degree.

10. A material of photo sensitive orientation control film for a liquid crystal comprising:
a first compound and a second compound;
wherein the first compound contains a polymer unit given by the following formula (102), (103), (113), (114), (116), or (117);
wherein the second compound contains a polymer unit given by the following formula (102), (103), (113), (114), (116), (117), (121), or (122) wherein the cyclobutane section is replaced with a section given by at least one of the following formulae (51) through (55):

[Formula 102]

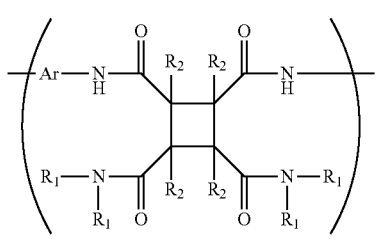

(102)

[Formula 103]

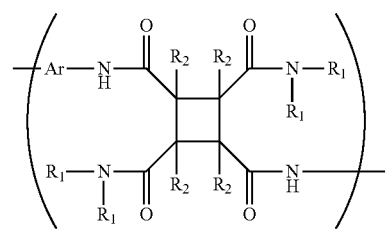

(103)

wherein each R$_1$ is individually hydrogen or an alkyl group containing 1 to 8 carbon atoms, each R$_2$ is individually a hydrogen atom, a fluorine atom, a chlorine atom, a bromine atom, a phenyl group, an alkyl group containing 1 to 6 carbon atoms, an alkoxy group containing 1 to 6 carbon atoms, a vinyl group (—(CH$_2$)m-CH=CH$_2$, m=0, 1, 2), or an alkynyl group (—(CH$_2$)m-C≡CH, m=0, 1, 2), and Ar is an aromatic compound;

[Formula 113]

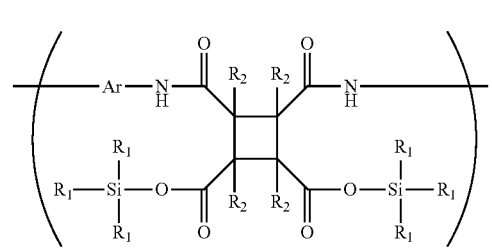

(113)

[Formula 114]

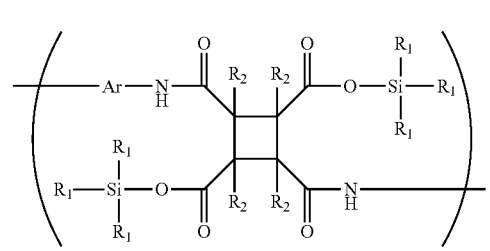

(114)

wherein each R$_1$ is individually hydrogen or an alkyl group containing 1 to 8 carbon atoms, each R$_2$ is individually a hydrogen atom, a fluorine atom, a chlorine atom, a bromine atom, a phenyl group, an alkyl group containing 1 to 6 carbon atoms, an alkoxy group containing 1 to 6 carbon atoms, a vinyl group (—(CH$_2$)m-CH=CH$_2$, m=0, 1, 2), or an alkynyl group (—(CH$_2$)m-C≡CH, m=0, 1, 2), and Ar is an aromatic compound;

[Formula 116]

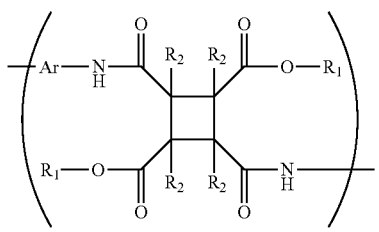
(116)

[Formula 117]

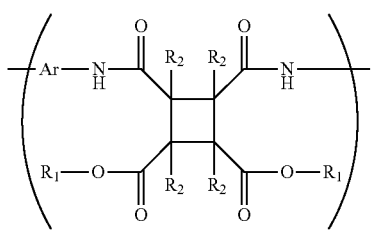
(117)

wherein each $R_1$ is individually an alkyl group containing 1 to 8 carbon atoms, each $R_2$ is individually a hydrogen atom, a fluorine atom, a chlorine atom, a bromine atom, a phenyl group, an alkyl group containing 1 to 6 carbon atoms, an alkoxy group containing 1 to 6 carbon atoms, a vinyl group (—$(CH_2)m$-CH=$CH_2$, m=0, 1, 2), or an alkynyl group (—$(CH_2)m$-C≡CH, m=0, 1, 2), and Ar is an aromatic compound;

[Formula 121]

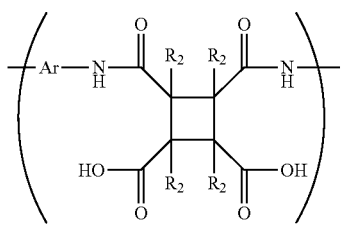
(121)

[Formula 122]

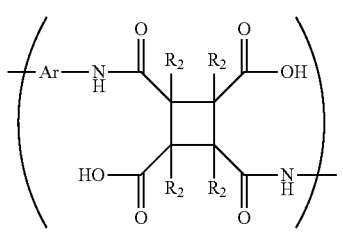
(122)

wherein each $R_2$ is individually a hydrogen atom, a fluorine atom, a chlorine atom, a bromine atom, a phenyl group, an alkyl group containing 1 to 6 carbon atoms, an alkoxy group containing 1 to 6 carbon atoms, a vinyl group (—$(CH_2)m$-CH=$CH_2$, m=0, 1, 2), or an alkynyl group (—$(CH_2)m$-C≡CH, m=0, 1, 2), and Ar is an aromatic compound;

[Formula 51]

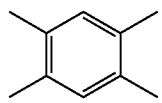
(51)

[Formula 52]

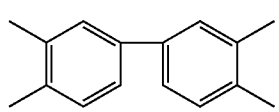
(52)

[Formula 53]

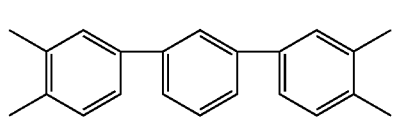
(53)

[Formula 54]

(54)

[Formula 55]

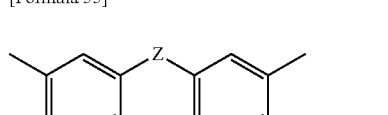
(55)

wherein: each hydrogen atom of the aromatic rings individually may instead be a fluorine atom, a chlorine atom, a bromine atom, a phenyl group, an alkyl group containing 1 to 8 carbon atoms, an alkoxy group, a vinyl group, or an alkynyl group; and Z is any of the following functional groups, (—$CH_2$—, —$CO_2$—, —NH—, —O—, —S—, —SO—, —$SO_2$—), wherein each hydrogen atom may instead be a fluorine atom, a chlorine atom, a bromine atom, a phenyl group, an alkyl group containing 1 to 8 carbon atoms, an alkoxy group, a vinyl group or an alkynyl group.

11. The material of photo sensitive orientation control film according to claim 10, wherein the aromatic compound Ar contains at least one of those given by the following formulae (1) through (11);

[Formula 1]

(1)

[Formula 2]

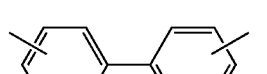
(2)

[Formula 3]

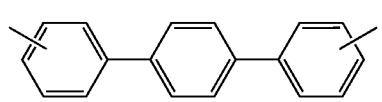
(3)

-continued

[Formula 4]

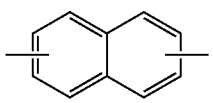

(4)

[Formula 5]

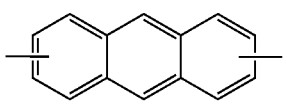

(5)

[Formula 6]

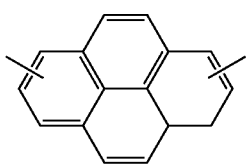

(6)

[Formula 7]

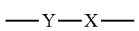
—Y—X—

(7)

[Formula 8]

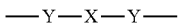
—Y—X—Y—

(8)

[Formula 9]

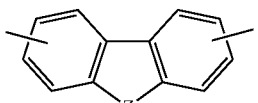

(9)

[Formula 10]

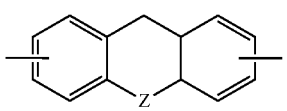

(10)

[Formula 11]

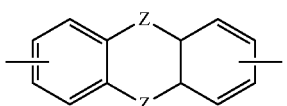

(11)

wherein: each hydrogen atom of the aromatic rings individually may instead be a fluorine atom, a chlorine atom, a bromine atom, a phenyl group, an alkyl group containing 1 to 8 carbon atoms, an alkoxy group, a vinyl group, or an alkynyl group; X is an alkyl group containing 1 to 8 carbon atoms, an alkoxy group, a vinyl group, an alkynyl group, or an alkyl group containing 0 to 8 carbon atoms and any of the following functional groups, (—O—, —CO—, —COO—, —S—, —SO—, —$SO_2$—, —NH—, —N=N—, phenyl group); Y is an aromatic ring such as a phenyl group, a naphthyl group, an anthracene group, or a pyrene group wherein each hydrogen atom of the aromatic ring individually may instead be a fluorine atom, a chlorine atom, a bromine atom, a phenyl group, an alkyl group containing 1 to 8 carbon atoms, an alkoxy group, a vinyl group, or an alkynyl group; and Z is any of the following functional groups, (—$CH_2$—, —$CO_2$—, —NH—, —O—, —S—, —SO—, —$SO_2$—), wherein each hydrogen atom may instead be a fluorine atom, a chlorine atom, a bromine atom, a phenyl group, an alkyl group containing 1 to 8 carbon atoms, an alkoxy group, a vinyl group, or an alkynyl group.

12. The material of photo sensitive orientation control film according to claim 10, wherein two of $R_2$ are methyl groups and two of $R_2$ are hydrogen atoms in the above formula (102), (103), (113), (114), (116), or (117) for the first compound.

13. The material of photo sensitive orientation control film according to claim 10, wherein the second compound contains the polymer unit given by the above formula (121) or (122).

14. The material of photo sensitive orientation control film according to claim 10, wherein the electric field applied to the liquid crystal layer has a component which is substantially parallel to the surface of a substrate on which the group of electrodes is formed.

15. The material of photo sensitive orientation control film according to claim 10, wherein the photo sensitive film orients the liquid crystal homogenous.

16. A liquid crystal display device comprising: the material of photo sensitive orientation control film according to claim 10.

* * * * *